(12) United States Patent
Lau

(10) Patent No.: US 12,502,167 B2
(45) Date of Patent: Dec. 23, 2025

(54) TISSUE REMODELING SYSTEMS AND METHODS

(71) Applicant: Edwards Lifesciences Corporation, Irvine, CA (US)

(72) Inventor: Jan R. Lau, Windsor, CA (US)

(73) Assignee: Edwards Lifesciences Corporation, Irvine, CA (US)

( * ) Notice: Subject to any disclaimer, the term of this patent is extended or adjusted under 35 U.S.C. 154(b) by 996 days.

(21) Appl. No.: 16/928,513

(22) Filed: Jul. 14, 2020

(65) Prior Publication Data

US 2021/0015475 A1     Jan. 21, 2021

Related U.S. Application Data

(60) Provisional application No. 62/874,837, filed on Jul. 16, 2019.

(51) Int. Cl.
*A61B 17/04* (2006.01)
*A61F 2/24* (2006.01)
*A61B 17/00* (2006.01)

(52) U.S. Cl.
CPC ........ *A61B 17/0401* (2013.01); *A61F 2/2454* (2013.01); *A61F 2/2466* (2013.01);
(Continued)

(58) Field of Classification Search
CPC ............ A61F 2220/0008; A61F 2/2427; A61F 2/2457; A61F 2/246; A61F 2220/0075; A61F 2/2442; A61F 2/245; A61B 2017/00243; A61B 17/0401; A61B 2017/0464; A61B 2017/0409; A61B 2017/00783; A61B 17/00234;
(Continued)

(56) References Cited

U.S. PATENT DOCUMENTS 3,604,488 A    9/1971   Wishart et al.
3,656,185 A    4/1972   Carpentier et al.
(Continued)

FOREIGN PATENT DOCUMENTS

CN    113331995 A     9/2021
EP      0004967      10/1979
(Continued)

OTHER PUBLICATIONS

International Search Report and Written Opinion in PCT/US2022/070020, dated Apr. 11, 2022, 18 pages.
(Continued)

*Primary Examiner* — Katherine M Shi
(74) *Attorney, Agent, or Firm* — Anya Adams

(57) ABSTRACT

Systems and methods for remodeling of tissue, such as heart tissue. In some configurations, the systems and methods are directed toward remodeling of the mitral valve of a patient. The systems and methods can include a first tissue anchor, a second tissue anchor, a suture that extends between the tissue anchors, and a suture lock that secures the suture relative to at least one of the tissue anchors or fixes a length of the suture. The systems and methods can also include a suture trimmer that can trim an excess portion of the suture. In some configurations, the suture lock is reversible to allow for iterative adjustments of the remodeling.

16 Claims, 13 Drawing Sheets

(52) U.S. Cl.
CPC .............. *A61B 2017/00243* (2013.01); *A61B 2017/00292* (2013.01); *A61B 2017/0409* (2013.01); *A61B 2017/0441* (2013.01); *A61B 2017/0464* (2013.01); *A61F 2220/0016* (2013.01); *A61F 2220/0041* (2013.01); *A61F 2220/0075* (2013.01); *A61F 2230/0006* (2013.01); *A61F 2230/0091* (2013.01)

(58) Field of Classification Search
CPC ........ A61B 2017/0649; A61B 17/0487; A61B 2017/0414; A61B 17/0469; A61B 2017/0488; A61B 2017/048; A61B 2017/0443

See application file for complete search history.

(56) References Cited

U.S. PATENT DOCUMENTS

| | | | |
|---|---|---|---|
| 3,840,018 A | 10/1974 | Heifetz et al. | |
| 3,881,366 A | 5/1975 | Bradley et al. | |
| 3,898,701 A | 8/1975 | La | |
| 3,902,501 A | 9/1975 | Citron et al. | |
| 3,976,082 A | 8/1976 | Schmitt | |
| 4,042,979 A | 8/1977 | Angell | |
| 4,118,805 A | 10/1978 | Reimels | |
| 4,214,349 A | 7/1980 | Munch | |
| 4,261,342 A | 4/1981 | Aranguren | |
| 4,290,151 A | 9/1981 | Massana | |
| 4,339,831 A | 7/1982 | Johnson | |
| 4,434,828 A | 3/1984 | Trincia | |
| 4,473,928 A | 10/1984 | Johnson | |
| 4,602,911 A | 7/1986 | Ahmadi et al. | |
| 4,625,727 A | 12/1986 | Leiboff | |
| 4,712,549 A | 12/1987 | Peters et al. | |
| 4,778,468 A | 10/1988 | Hunt et al. | |
| 4,913,164 A | 4/1990 | Greene et al. | |
| 4,917,698 A | 4/1990 | Carpentier et al. | |
| 4,935,027 A | 6/1990 | Yoon | |
| 4,953,564 A | 9/1990 | Berthelsen | |
| 4,961,738 A | 10/1990 | Mackin | |
| 5,042,707 A | 8/1991 | Taheri | |
| 5,061,277 A | 10/1991 | Carpentier et al. | |
| 5,064,431 A | 11/1991 | Gilbertson et al. | |
| 5,104,407 A | 4/1992 | Lam et al. | |
| 5,108,420 A | 4/1992 | Marks | |
| 5,152,790 A | 10/1992 | Rosenberg et al. | |
| 5,179,962 A | 1/1993 | Dutcher et al. | |
| 5,201,880 A | 4/1993 | Wright et al. | |
| 5,258,008 A | 11/1993 | Wilk | |
| 5,300,034 A | 4/1994 | Behnke et al. | |
| 5,314,461 A | 5/1994 | Borghi | |
| 5,325,845 A | 7/1994 | Adair | |
| 5,346,498 A | 9/1994 | Greelis et al. | |
| 5,383,852 A | 1/1995 | Stevens-Wright et al. | |
| 5,449,368 A | 9/1995 | Kuzmak | |
| 5,450,860 A | 9/1995 | O'Connor | |
| 5,464,404 A | 11/1995 | Abela et al. | |
| 5,474,518 A | 12/1995 | Farrer | |
| 5,477,856 A | 12/1995 | Lundquist | |
| 5,571,162 A | 11/1996 | Lin | |
| 5,593,424 A | 1/1997 | Northrup, III | |
| 5,601,572 A | 2/1997 | Middleman et al. | |
| 5,626,609 A | 5/1997 | Zvenyatsky et al. | |
| 5,643,317 A | 7/1997 | Pavcnik et al. | |
| 5,658,327 A | 8/1997 | Altman et al. | |
| 5,669,919 A | 9/1997 | Sanders et al. | |
| 5,676,653 A | 10/1997 | Taylor et al. | |
| 5,683,402 A | 11/1997 | Cosgrove et al. | |
| 5,702,397 A | 12/1997 | Goble et al. | |
| 5,702,398 A | 12/1997 | Tarabishy | |
| 5,709,695 A | 1/1998 | Northrup, III | |
| 5,716,370 A | 2/1998 | Williamson, IV et al. | |
| 5,716,397 A | 2/1998 | Myers | |
| 5,728,116 A | 3/1998 | Rosenman | |
| 5,730,150 A | 3/1998 | Peppel et al. | |
| 5,749,371 A | 5/1998 | Zadini et al. | |
| 5,752,963 A | 5/1998 | Allard et al. | |
| 5,782,844 A | 7/1998 | Yoon et al. | |
| 5,810,882 A | 9/1998 | Bolduc et al. | |
| 5,824,066 A | 10/1998 | Gross | |
| 5,830,221 A | 11/1998 | Stein et al. | |
| 5,843,120 A | 12/1998 | Israel et al. | |
| 5,855,614 A | 1/1999 | Stevens et al. | |
| 5,868,789 A * | 2/1999 | Huebner ............ | A61B 17/0401 606/232 |
| 5,876,373 A | 3/1999 | Giba et al. | |
| 5,935,098 A | 8/1999 | Blaisdell et al. | |
| 5,957,953 A | 9/1999 | DiPoto et al. | |
| 5,961,440 A | 10/1999 | Schweich, Jr. et al. | |
| 5,961,539 A | 10/1999 | Northrup, III et al. | |
| 5,984,959 A | 11/1999 | Robertson et al. | |
| 5,993,459 A | 11/1999 | Larsen et al. | |
| 6,042,554 A | 3/2000 | Rosenman et al. | |
| 6,045,497 A | 4/2000 | Schweich, Jr. et al. | |
| 6,050,936 A | 4/2000 | Schweich, Jr. et al. | |
| 6,059,715 A | 5/2000 | Schweich, Jr. et al. | |
| 6,074,341 A | 6/2000 | Anderson et al. | |
| 6,074,401 A | 6/2000 | Gardiner et al. | |
| 6,074,417 A | 6/2000 | Peredo | |
| 6,086,582 A | 7/2000 | Altman et al. | |
| 6,086,608 A | 7/2000 | Ek et al. | |
| 6,102,945 A | 8/2000 | Campbell | |
| 6,106,550 A | 8/2000 | Magovern et al. | |
| 6,110,200 A | 8/2000 | Hinnenkamp | |
| 6,132,390 A | 10/2000 | Cookston et al. | |
| 6,143,024 A | 11/2000 | Campbell et al. | |
| 6,159,240 A | 12/2000 | Sparer et al. | |
| 6,165,119 A | 12/2000 | Schweich, Jr. et al. | |
| 6,174,332 B1 | 1/2001 | Loch et al. | |
| 6,183,411 B1 | 2/2001 | Mortier et al. | |
| 6,187,040 B1 | 2/2001 | Wright | |
| 6,210,347 B1 | 4/2001 | Forsell | |
| 6,217,610 B1 | 4/2001 | Carpentier et al. | |
| 6,228,032 B1 | 5/2001 | Eaton et al. | |
| 6,231,602 B1 | 5/2001 | Carpentier et al. | |
| 6,251,092 B1 | 6/2001 | Qin et al. | |
| 6,296,656 B1 | 10/2001 | Bolduc et al. | |
| 6,315,784 B1 | 11/2001 | Djurovic | |
| 6,319,281 B1 | 11/2001 | Patel | |
| 6,328,746 B1 | 12/2001 | Gambale | |
| 6,332,893 B1 | 12/2001 | Mortier et al. | |
| 6,355,030 B1 | 3/2002 | Aldrich et al. | |
| 6,361,559 B1 | 3/2002 | Houser et al. | |
| 6,368,348 B1 | 4/2002 | Gabbay | |
| 6,402,780 B2 | 6/2002 | Williamson, IV et al. | |
| 6,406,420 B1 | 6/2002 | McCarthy et al. | |
| 6,406,493 B1 | 6/2002 | Tu et al. | |
| 6,419,696 B1 | 7/2002 | Ortiz et al. | |
| 6,451,054 B1 | 9/2002 | Stevens | |
| 6,458,076 B1 | 10/2002 | Pruitt | |
| 6,461,336 B1 | 10/2002 | Larre | |
| 6,461,366 B1 | 10/2002 | Seguin | |
| 6,470,892 B1 | 10/2002 | Forsell | |
| 6,503,274 B1 | 1/2003 | Howanec, Jr. et al. | |
| 6,524,338 B1 | 2/2003 | Gundry | |
| 6,527,780 B1 | 3/2003 | Wallace et al. | |
| 6,530,952 B2 | 3/2003 | Vesely | |
| 6,533,772 B1 | 3/2003 | Sherts et al. | |
| 6,537,314 B2 | 3/2003 | Langberg et al. | |
| 6,547,801 B1 | 4/2003 | Dargent et al. | |
| 6,554,845 B1 | 4/2003 | Fleenor et al. | |
| 6,564,805 B2 | 5/2003 | Garrison et al. | |
| 6,565,603 B2 | 5/2003 | Cox | |
| 6,569,198 B1 | 5/2003 | Wilson et al. | |
| 6,579,297 B2 | 6/2003 | Bicek et al. | |
| 6,589,160 B2 | 7/2003 | Schweich, Jr. et al. | |
| 6,592,593 B1 | 7/2003 | Parodi et al. | |
| 6,602,288 B1 | 8/2003 | Cosgrove et al. | |
| 6,602,289 B1 | 8/2003 | Colvin et al. | |
| 6,613,078 B1 | 9/2003 | Barone | |
| 6,613,079 B1 | 9/2003 | Wolinsky et al. | |
| 6,619,291 B2 | 9/2003 | Hlavka et al. | |
| 6,626,917 B1 | 9/2003 | Craig | |
| 6,626,930 B1 | 9/2003 | Allen et al. | |

(56) References Cited

U.S. PATENT DOCUMENTS

| | | |
|---|---|---|
| 6,629,534 B1 | 10/2003 | St. Goar et al. |
| 6,629,921 B1 | 10/2003 | Schweich, Jr. et al. |
| 6,651,671 B1 | 11/2003 | Donlon et al. |
| 6,652,556 B1 | 11/2003 | VanTassel et al. |
| 6,682,558 B2 | 1/2004 | Tu et al. |
| 6,684,109 B1 | 1/2004 | Osypka |
| 6,689,125 B1 | 2/2004 | Keith et al. |
| 6,689,164 B1 | 2/2004 | Seguin |
| 6,695,866 B1 | 2/2004 | Kuehn et al. |
| 6,702,826 B2 | 3/2004 | Liddicoat et al. |
| 6,702,846 B2 | 3/2004 | Mikus et al. |
| 6,706,065 B2 | 3/2004 | Langberg et al. |
| 6,709,385 B2 | 3/2004 | Forsell |
| 6,709,456 B2 | 3/2004 | Langberg et al. |
| 6,711,444 B2 | 3/2004 | Koblish |
| 6,719,786 B2 | 4/2004 | Ryan et al. |
| 6,723,038 B1 | 4/2004 | Schroeder et al. |
| 6,726,716 B2 | 4/2004 | Marquez |
| 6,726,717 B2 | 4/2004 | Alfieri et al. |
| 6,749,630 B2 | 6/2004 | McCarthy et al. |
| 6,752,813 B2 | 6/2004 | Goldfarb et al. |
| 6,764,310 B1 | 7/2004 | Ichihashi et al. |
| 6,764,510 B2 | 7/2004 | Vidlund et al. |
| 6,764,810 B2 | 7/2004 | Ma et al. |
| 6,770,083 B2 | 8/2004 | Seguin |
| 6,786,924 B2 | 9/2004 | Ryan et al. |
| 6,786,925 B1 | 9/2004 | Schoon et al. |
| 6,790,231 B2 | 9/2004 | Liddicoat et al. |
| 6,797,001 B2 | 9/2004 | Mathis et al. |
| 6,797,002 B2 | 9/2004 | Spence et al. |
| 6,802,319 B2 | 10/2004 | Stevens et al. |
| 6,805,711 B2 | 10/2004 | Quijano et al. |
| 6,855,126 B2 | 2/2005 | Flinchbaugh |
| 6,858,039 B2 | 2/2005 | McCarthy |
| 6,884,250 B2 | 4/2005 | Monassevitch et al. |
| 6,893,459 B1 | 5/2005 | Macoviak |
| 6,908,478 B2 | 6/2005 | Alferness et al. |
| 6,908,482 B2 | 6/2005 | McCarthy et al. |
| 6,918,917 B1 | 7/2005 | Nguyen et al. |
| 6,926,730 B1 | 8/2005 | Nguyen et al. |
| 6,960,217 B2 | 11/2005 | Bolduc |
| 6,976,995 B2 | 12/2005 | Mathis et al. |
| 6,986,775 B2 | 1/2006 | Morales et al. |
| 6,989,028 B2 | 1/2006 | Lashinski et al. |
| 6,997,951 B2 | 2/2006 | Solem et al. |
| 7,004,176 B2 | 2/2006 | Lau |
| 7,007,798 B2 | 3/2006 | Happonen et al. |
| 7,011,669 B2 | 3/2006 | Kimblad |
| 7,011,682 B2 | 3/2006 | Lashinski et al. |
| 7,018,406 B2 | 3/2006 | Seguin et al. |
| 7,037,334 B1 | 5/2006 | Hlavka et al. |
| 7,077,850 B2 | 7/2006 | Kortenbach |
| 7,077,862 B2 | 7/2006 | Vidlund et al. |
| 7,087,064 B1 | 8/2006 | Hyde |
| 7,101,396 B2 | 9/2006 | Artof et al. |
| 7,112,207 B2 | 9/2006 | Allen et al. |
| 7,118,595 B2 | 10/2006 | Ryan et al. |
| 7,125,421 B2 | 10/2006 | Tremulis et al. |
| 7,144,413 B2 | 12/2006 | Wilford et al. |
| 7,149,587 B2 | 12/2006 | Wardle et al. |
| 7,150,737 B2 | 12/2006 | Purdy et al. |
| 7,159,593 B2 | 1/2007 | McCarthy et al. |
| 7,166,127 B2 | 1/2007 | Spence et al. |
| 7,169,187 B2 | 1/2007 | Datta et al. |
| 7,172,625 B2 | 2/2007 | Shu et al. |
| 7,175,660 B2 | 2/2007 | Cartledge et al. |
| 7,186,262 B2 | 3/2007 | Saadat |
| 7,186,264 B2 | 3/2007 | Liddicoat et al. |
| 7,189,199 B2 | 3/2007 | McCarthy et al. |
| 7,192,443 B2 | 3/2007 | Solem et al. |
| 7,220,277 B2 | 5/2007 | Arru et al. |
| 7,226,467 B2 | 6/2007 | Lucatero et al. |
| 7,226,477 B2 | 6/2007 | Cox |
| 7,226,647 B2 | 6/2007 | Kasperchik et al. |
| 7,229,452 B2 | 6/2007 | Kayan |
| 7,238,191 B2 | 7/2007 | Bachmann |
| 7,288,097 B2 | 10/2007 | Seguin |
| 7,294,148 B2 | 11/2007 | McCarthy |
| 7,311,728 B2 | 12/2007 | Solem et al. |
| 7,311,729 B2 | 12/2007 | Mathis et al. |
| 7,314,485 B2 | 1/2008 | Mathis |
| 7,316,706 B2 | 1/2008 | Bloom et al. |
| 7,316,710 B1 | 1/2008 | Cheng et al. |
| 7,329,279 B2 | 2/2008 | Haug et al. |
| 7,329,280 B2 | 2/2008 | Bolling et al. |
| 7,335,213 B1 | 2/2008 | Hyde et al. |
| 7,361,190 B2 | 4/2008 | Shaoulian et al. |
| 7,364,588 B2 | 4/2008 | Mathis et al. |
| 7,377,941 B2 | 5/2008 | Rhee et al. |
| RE40,377 E | 6/2008 | Williamson, IV et al. |
| 7,390,329 B2 | 6/2008 | Westra et al. |
| 7,404,824 B1 | 7/2008 | Webler et al. |
| 7,418,298 B2 | 8/2008 | Shiroff et al. |
| 7,431,692 B2 | 10/2008 | Zollinger et al. |
| 7,442,207 B2 | 10/2008 | Rafiee |
| 7,452,376 B2 | 11/2008 | Lim et al. |
| 7,455,690 B2 | 11/2008 | Cartledge et al. |
| 7,485,142 B2 | 2/2009 | Milo |
| 7,485,143 B2 | 2/2009 | Webler et al. |
| 7,500,989 B2 | 3/2009 | Solem et al. |
| 7,507,252 B2 | 3/2009 | Lashinski et al. |
| 7,510,575 B2 | 3/2009 | Spenser et al. |
| 7,510,577 B2 | 3/2009 | Moaddeb et al. |
| 7,527,647 B2 | 5/2009 | Spence |
| 7,530,995 B2 | 5/2009 | Quijano et al. |
| 7,549,983 B2 | 6/2009 | Roue et al. |
| 7,559,936 B2 | 7/2009 | Levine |
| 7,562,660 B2 | 7/2009 | Saadat |
| 7,563,267 B2 | 7/2009 | Goldfarb et al. |
| 7,563,273 B2 | 7/2009 | Goldfarb et al. |
| 7,569,062 B1 | 8/2009 | Kuehn et al. |
| 7,585,321 B2 | 9/2009 | Cribier |
| 7,588,582 B2 | 9/2009 | Starksen et al. |
| 7,591,826 B2 | 9/2009 | Alferness et al. |
| 7,601,117 B2 | 10/2009 | Kute et al. |
| 7,604,646 B2 | 10/2009 | Goldfarb et al. |
| 7,608,091 B2 | 10/2009 | Goldfarb et al. |
| 7,608,103 B2 | 10/2009 | McCarthy |
| 7,625,403 B2 | 12/2009 | Krivoruchko |
| 7,632,303 B1 | 12/2009 | Stalker et al. |
| 7,635,329 B2 | 12/2009 | Goldfarb et al. |
| 7,635,386 B1 | 12/2009 | Gammie |
| 7,655,015 B2 | 2/2010 | Goldfarb et al. |
| 7,666,204 B2 | 2/2010 | Thornton et al. |
| 7,682,319 B2 | 3/2010 | Martin et al. |
| 7,682,369 B2 | 3/2010 | Seguin |
| 7,686,822 B2 | 3/2010 | Shayani |
| 7,691,144 B2 | 4/2010 | Chang et al. |
| 7,699,892 B2 | 4/2010 | Rafiee et al. |
| 7,704,269 B2 | 4/2010 | St Goar et al. |
| 7,704,277 B2 | 4/2010 | Zakay et al. |
| 7,722,666 B2 | 5/2010 | Lafontaine |
| 7,736,388 B2 | 6/2010 | Goldfarb et al. |
| 7,748,389 B2 | 7/2010 | Salahieh et al. |
| 7,753,924 B2 | 7/2010 | Starksen et al. |
| 7,758,632 B2 | 7/2010 | Hojeibane et al. |
| 7,780,726 B2 | 8/2010 | Seguin |
| 7,871,368 B2 | 1/2011 | Zollinger et al. |
| 7,871,433 B2 | 1/2011 | Lattouf |
| 7,883,475 B2 | 2/2011 | Dupont et al. |
| 7,883,538 B2 | 2/2011 | To et al. |
| 7,892,281 B2 | 2/2011 | Seguin et al. |
| 7,927,370 B2 | 4/2011 | Webler et al. |
| 7,927,371 B2 | 4/2011 | Navia et al. |
| 7,942,927 B2 | 5/2011 | Kaye et al. |
| 7,947,056 B2 | 5/2011 | Griego et al. |
| 7,955,315 B2 | 6/2011 | Feinberg et al. |
| 7,955,377 B2 | 6/2011 | Melsheimer |
| 7,981,152 B1 | 7/2011 | Webler et al. |
| 7,992,567 B2 | 8/2011 | Hirotsuka et al. |
| 7,993,397 B2 | 8/2011 | Lashinski et al. |
| 8,012,201 B2 | 9/2011 | Lashinski et al. |
| 8,034,103 B2 | 10/2011 | Burriesci et al. |
| 8,052,592 B2 | 11/2011 | Goldfarb et al. |

(56) References Cited

U.S. PATENT DOCUMENTS

| | | |
|---|---|---|
| 8,052,731 B2 | 11/2011 | Soltis et al. |
| 8,057,493 B2 | 11/2011 | Goldfarb et al. |
| 8,062,355 B2 | 11/2011 | Figulla et al. |
| 8,070,804 B2 | 12/2011 | Hyde et al. |
| 8,070,805 B2 | 12/2011 | Vidlund et al. |
| 8,075,616 B2 | 12/2011 | Solem et al. |
| 8,100,964 B2 | 1/2012 | Spence |
| 8,123,801 B2 | 2/2012 | Milo |
| 8,142,493 B2 | 3/2012 | Spence et al. |
| 8,142,495 B2 | 3/2012 | Hasenkam et al. |
| 8,142,496 B2 | 3/2012 | Berreklouw |
| 8,147,542 B2 | 4/2012 | Maisano et al. |
| 8,152,844 B2 | 4/2012 | Rao et al. |
| 8,163,013 B2 | 4/2012 | Machold et al. |
| 8,187,299 B2 | 5/2012 | Goldfarb et al. |
| 8,187,324 B2 | 5/2012 | Webler et al. |
| 8,202,315 B2 | 6/2012 | Hlavka et al. |
| 8,206,439 B2 | 6/2012 | Gomez |
| 8,216,302 B2 | 7/2012 | Wilson et al. |
| 8,231,671 B2 | 7/2012 | Kim |
| 8,262,725 B2 | 9/2012 | Subramanian |
| 8,265,758 B2 | 9/2012 | Policker et al. |
| 8,277,502 B2 | 10/2012 | Miller et al. |
| 8,287,584 B2 | 10/2012 | Salahieh et al. |
| 8,287,591 B2 | 10/2012 | Keidar et al. |
| 8,292,884 B2 | 10/2012 | Levine et al. |
| 8,303,608 B2 | 11/2012 | Goldfarb et al. |
| 8,323,334 B2 | 12/2012 | Deem et al. |
| 8,328,868 B2 | 12/2012 | Paul et al. |
| 8,343,173 B2 | 1/2013 | Starksen et al. |
| 8,343,174 B2 | 1/2013 | Goldfarb et al. |
| 8,343,213 B2 | 1/2013 | Salahieh et al. |
| 8,349,002 B2 | 1/2013 | Milo |
| 8,353,956 B2 | 1/2013 | Miller et al. |
| 8,357,195 B2 | 1/2013 | Kuehn |
| 8,382,653 B2 | 2/2013 | Dubi et al. |
| 8,382,829 B1 | 2/2013 | Call et al. |
| 8,388,680 B2 | 3/2013 | Starksen et al. |
| 8,393,517 B2 | 3/2013 | Milo |
| 8,419,825 B2 | 4/2013 | Buergler et al. |
| 8,430,926 B2 | 4/2013 | Kirson |
| 8,449,573 B2 | 5/2013 | Chu |
| 8,449,599 B2 | 5/2013 | Chau et al. |
| 8,454,686 B2 | 6/2013 | Alkhatib |
| 8,460,370 B2 | 6/2013 | Zakay et al. |
| 8,460,371 B2 | 6/2013 | Hlavka et al. |
| 8,475,491 B2 | 7/2013 | Milo |
| 8,475,525 B2 | 7/2013 | Maisano et al. |
| 8,480,732 B2 | 7/2013 | Subramanian |
| 8,489,189 B2 | 7/2013 | Tronnes |
| 8,518,107 B2 | 8/2013 | Tsukashima et al. |
| 8,523,940 B2 | 9/2013 | Richardson et al. |
| 8,532,790 B2 | 9/2013 | Griswold |
| 8,551,161 B2 | 10/2013 | Dolan |
| 8,585,755 B2 | 11/2013 | Chau et al. |
| 8,591,576 B2 | 11/2013 | Hasenkam et al. |
| 8,608,797 B2 | 12/2013 | Gross et al. |
| 8,628,569 B2 | 1/2014 | Benichou et al. |
| 8,628,571 B1 | 1/2014 | Hacohen et al. |
| 8,641,727 B2 | 2/2014 | Starksen et al. |
| 8,652,202 B2 | 2/2014 | Alon et al. |
| 8,652,203 B2 | 2/2014 | Quadri et al. |
| 8,679,174 B2 | 3/2014 | Ottma et al. |
| 8,685,086 B2 | 4/2014 | Navia et al. |
| 8,728,097 B1 | 5/2014 | Sugimoto et al. |
| 8,728,155 B2 | 5/2014 | Montorfano et al. |
| 8,734,484 B2 | 5/2014 | Ahlberg et al. |
| 8,734,699 B2 | 5/2014 | Heideman et al. |
| 8,740,920 B2 | 6/2014 | Goldfarb et al. |
| 8,747,463 B2 | 6/2014 | Fogarty et al. |
| 8,758,405 B2 | 6/2014 | Zeiner et al. |
| 8,778,021 B2 | 7/2014 | Cartledge |
| 8,784,481 B2 | 7/2014 | Alkhatib et al. |
| 8,790,367 B2 | 7/2014 | Nguyen et al. |
| 8,795,355 B2 | 8/2014 | Alkhatib |
| 8,795,356 B2 | 8/2014 | Quadri et al. |
| 8,795,357 B2 | 8/2014 | Yohanan et al. |
| 8,808,366 B2 | 8/2014 | Braido et al. |
| 8,845,723 B2 | 9/2014 | Spence et al. |
| 8,852,261 B2 | 10/2014 | White |
| 8,852,272 B2 | 10/2014 | Gross et al. |
| 8,858,623 B2 | 10/2014 | Miller et al. |
| 8,864,822 B2 | 10/2014 | Spence et al. |
| 8,870,948 B1 | 10/2014 | Erzberger et al. |
| 8,870,949 B2 | 10/2014 | Rowe |
| 8,888,843 B2 | 11/2014 | Khairkhahan et al. |
| 8,889,861 B2 | 11/2014 | Skead et al. |
| 8,894,702 B2 | 11/2014 | Quadri et al. |
| 8,911,461 B2 | 12/2014 | Traynor et al. |
| 8,926,697 B2 | 1/2015 | Gross et al. |
| 8,932,343 B2 | 1/2015 | Alkhatib et al. |
| 8,932,348 B2 | 1/2015 | Solem et al. |
| 8,940,044 B2 | 1/2015 | Hammer et al. |
| 8,945,211 B2 | 2/2015 | Sugimoto |
| 8,951,285 B2 | 2/2015 | Sugimoto et al. |
| 8,951,286 B2 | 2/2015 | Sugimoto et al. |
| 8,961,595 B2 | 2/2015 | Alkhatib |
| 8,961,597 B2 | 2/2015 | Subramanian et al. |
| 8,961,602 B2 | 2/2015 | Kovach et al. |
| 8,979,922 B2 | 3/2015 | Jayasinghe et al. |
| 8,986,370 B2 | 3/2015 | Annest |
| 8,992,604 B2 | 3/2015 | Gross et al. |
| 9,005,273 B2 | 4/2015 | Salahieh et al. |
| 9,011,520 B2 | 4/2015 | Miller et al. |
| 9,011,530 B2 | 4/2015 | Reich et al. |
| 9,020,611 B2 | 4/2015 | Khairkhahan et al. |
| 9,023,100 B2 | 5/2015 | Quadri et al. |
| 9,072,603 B2 | 7/2015 | Tuval et al. |
| 9,107,749 B2 | 8/2015 | Bobo et al. |
| 9,119,719 B2 | 9/2015 | Zipory et al. |
| 9,125,632 B2 | 9/2015 | Loulmet et al. |
| 9,125,742 B2 | 9/2015 | Yoganathan et al. |
| 9,138,316 B2 | 9/2015 | Bielefeld |
| 9,173,646 B2 | 11/2015 | Fabro |
| 9,180,005 B1 | 11/2015 | Lashinski et al. |
| 9,180,007 B2 | 11/2015 | Reich et al. |
| 9,192,472 B2 | 11/2015 | Gross et al. |
| 9,198,756 B2 | 12/2015 | Aklog et al. |
| 9,204,964 B2 | 12/2015 | Dahlgren et al. |
| 9,226,825 B2 | 1/2016 | Starksen et al. |
| 9,237,886 B2 | 1/2016 | Seguin et al. |
| 9,265,608 B2 | 2/2016 | Miller et al. |
| 9,308,365 B2 | 4/2016 | Nordstrom et al. |
| 9,326,857 B2 | 5/2016 | Cartledge et al. |
| 9,333,342 B2 | 5/2016 | Haasl et al. |
| 9,358,387 B2 | 6/2016 | Suwito et al. |
| 9,414,921 B2 | 8/2016 | Miller et al. |
| 9,427,316 B2 | 8/2016 | Schweich, Jr. et al. |
| 9,474,606 B2 | 10/2016 | Zipory et al. |
| 9,504,571 B2 | 11/2016 | Rowe et al. |
| 9,526,613 B2 | 12/2016 | Gross et al. |
| 9,561,104 B2 | 2/2017 | Miller et al. |
| 9,579,090 B1 | 2/2017 | Simms et al. |
| 9,579,196 B2 | 2/2017 | Morriss et al. |
| 9,585,753 B2 | 3/2017 | Subramanian et al. |
| 9,693,865 B2 | 7/2017 | Gilmore et al. |
| 9,730,793 B2 | 8/2017 | Reich et al. |
| 9,788,941 B2 | 10/2017 | Hacohen |
| 9,801,720 B2 | 10/2017 | Gilmore et al. |
| 9,861,350 B2 | 1/2018 | Serina et al. |
| 9,907,547 B2 | 3/2018 | Gilmore et al. |
| 9,907,953 B2 | 3/2018 | Orts et al. |
| 10,010,419 B2 | 7/2018 | Yoganathan et al. |
| 10,022,538 B2 | 7/2018 | Drasler et al. |
| 10,028,737 B2 | 7/2018 | Stucki et al. |
| 10,076,377 B2 | 9/2018 | Bonutti et al. |
| 10,080,660 B2 | 9/2018 | Keane |
| 10,080,887 B2 | 9/2018 | Schmidt et al. |
| 10,143,553 B2 | 12/2018 | Alon et al. |
| 10,154,838 B2 | 12/2018 | Solem |
| 10,195,421 B2 | 2/2019 | Marshall et al. |
| 10,206,776 B2 | 2/2019 | Alon |
| 10,251,635 B2 | 4/2019 | Khairkhahan et al. |
| 10,368,852 B2 | 8/2019 | Gerhardt et al. |

(56) References Cited

U.S. PATENT DOCUMENTS

| | | |
|---|---|---|
| 2001/0021874 A1 | 9/2001 | Carpentier et al. |
| 2002/0022862 A1 | 2/2002 | Grafton et al. |
| 2002/0035361 A1 | 3/2002 | Houser et al. |
| 2002/0082525 A1 | 6/2002 | Oslund et al. |
| 2002/0087048 A1 | 7/2002 | Brock et al. |
| 2002/0103532 A1 | 8/2002 | Langberg et al. |
| 2002/0120292 A1 | 8/2002 | Morgan |
| 2002/0151916 A1 | 10/2002 | Muramatsu et al. |
| 2002/0151970 A1 | 10/2002 | Garrison et al. |
| 2002/0169358 A1 | 11/2002 | Mortier et al. |
| 2002/0177904 A1 | 11/2002 | Huxel et al. |
| 2002/0188301 A1 | 12/2002 | Dallara et al. |
| 2002/0188350 A1 | 12/2002 | Arru et al. |
| 2002/0198586 A1 | 12/2002 | Inoue |
| 2003/0050693 A1 | 3/2003 | Quijano et al. |
| 2003/0057156 A1 | 3/2003 | Peterson et al. |
| 2003/0078465 A1 | 4/2003 | Pai et al. |
| 2003/0078653 A1 | 4/2003 | Vesely et al. |
| 2003/0083538 A1 | 5/2003 | Adams et al. |
| 2003/0093148 A1 | 5/2003 | Bolling et al. |
| 2003/0105519 A1 | 6/2003 | Fasol et al. |
| 2003/0114901 A1 | 6/2003 | Loeb et al. |
| 2003/0120340 A1 | 6/2003 | Liska et al. |
| 2003/0144657 A1 | 7/2003 | Bowe et al. |
| 2003/0167062 A1 | 9/2003 | Gambale et al. |
| 2003/0171760 A1 | 9/2003 | Gambale |
| 2003/0199974 A1 | 10/2003 | Lee et al. |
| 2003/0204193 A1 | 10/2003 | Gabriel et al. |
| 2003/0204195 A1 | 10/2003 | Keane et al. |
| 2003/0229350 A1 | 12/2003 | Kay |
| 2003/0229395 A1 | 12/2003 | Cox |
| 2004/0002735 A1 | 1/2004 | Lizardi et al. |
| 2004/0010287 A1 | 1/2004 | Bonutti |
| 2004/0019359 A1 | 1/2004 | Worley et al. |
| 2004/0019377 A1 | 1/2004 | Taylor et al. |
| 2004/0024451 A1 | 2/2004 | Johnson et al. |
| 2004/0039442 A1 | 2/2004 | St Goar et al. |
| 2004/0044350 A1 | 3/2004 | Martin et al. |
| 2004/0049211 A1 | 3/2004 | Tremulis et al. |
| 2004/0059413 A1 | 3/2004 | Argento |
| 2004/0068273 A1 | 4/2004 | Fariss et al. |
| 2004/0106950 A1 | 6/2004 | Grafton et al. |
| 2004/0111095 A1 | 6/2004 | Gordon et al. |
| 2004/0122514 A1 | 6/2004 | Fogarty et al. |
| 2004/0127982 A1 | 7/2004 | Machold et al. |
| 2004/0133274 A1 | 7/2004 | Webler et al. |
| 2004/0133374 A1 | 7/2004 | Kattan |
| 2004/0138744 A1 | 7/2004 | Lashinski et al. |
| 2004/0138745 A1 | 7/2004 | Macoviak et al. |
| 2004/0148019 A1 | 7/2004 | Vidlund et al. |
| 2004/0148020 A1 | 7/2004 | Vidlund et al. |
| 2004/0148021 A1 | 7/2004 | Cartledge et al. |
| 2004/0152947 A1 | 8/2004 | Schroeder et al. |
| 2004/0176788 A1 | 9/2004 | Opolski |
| 2004/0181287 A1 | 9/2004 | Gellman |
| 2004/0186566 A1 | 9/2004 | Hindrichs et al. |
| 2004/0193191 A1 | 9/2004 | Starksen et al. |
| 2004/0243227 A1 | 12/2004 | Starksen et al. |
| 2004/0260317 A1 | 12/2004 | Bloom et al. |
| 2004/0260344 A1 | 12/2004 | Lyons et al. |
| 2004/0260393 A1 | 12/2004 | Rahdert et al. |
| 2004/0260394 A1 | 12/2004 | Douk et al. |
| 2004/0267358 A1 | 12/2004 | Reitan |
| 2005/0004668 A1 | 1/2005 | Aklog et al. |
| 2005/0010287 A1 | 1/2005 | Macoviak et al. |
| 2005/0010787 A1 | 1/2005 | Tarbouriech |
| 2005/0016560 A1 | 1/2005 | Voughlohn |
| 2005/0049692 A1 | 3/2005 | Numamoto et al. |
| 2005/0055038 A1 | 3/2005 | Kelleher et al. |
| 2005/0055087 A1 | 3/2005 | Starksen |
| 2005/0060030 A1 | 3/2005 | Lashinski et al. |
| 2005/0065601 A1 | 3/2005 | Lee et al. |
| 2005/0070999 A1 | 3/2005 | Spence |
| 2005/0075654 A1 | 4/2005 | Kelleher |
| 2005/0075727 A1 | 4/2005 | Wheatley |
| 2005/0090827 A1 | 4/2005 | Gedebou |
| 2005/0090834 A1 | 4/2005 | Chiang et al. |
| 2005/0096740 A1 | 5/2005 | Langberg et al. |
| 2005/0107871 A1 | 5/2005 | Realyvasquez et al. |
| 2005/0119734 A1 | 6/2005 | Spence et al. |
| 2005/0125002 A1 | 6/2005 | Baran et al. |
| 2005/0125011 A1 | 6/2005 | Spence et al. |
| 2005/0131533 A1 | 6/2005 | Alfieri et al. |
| 2005/0137686 A1 | 6/2005 | Salahieh et al. |
| 2005/0137688 A1 | 6/2005 | Salahieh et al. |
| 2005/0137695 A1 | 6/2005 | Salahieh et al. |
| 2005/0159728 A1 | 7/2005 | Armour et al. |
| 2005/0159810 A1 | 7/2005 | Filsoufi |
| 2005/0171601 A1 | 8/2005 | Cosgrove et al. |
| 2005/0177180 A1 | 8/2005 | Kaganov et al. |
| 2005/0177228 A1 | 8/2005 | Solem et al. |
| 2005/0187568 A1 | 8/2005 | Klenk et al. |
| 2005/0192596 A1 | 9/2005 | Jugenheimer et al. |
| 2005/0203549 A1 | 9/2005 | Realyvasquez |
| 2005/0203606 A1 | 9/2005 | Vancamp |
| 2005/0216039 A1 | 9/2005 | Lederman |
| 2005/0216079 A1 | 9/2005 | Macoviak |
| 2005/0222665 A1 | 10/2005 | Aranyi |
| 2005/0234481 A1 | 10/2005 | Waller |
| 2005/0240199 A1 | 10/2005 | Martinek et al. |
| 2005/0251177 A1 | 11/2005 | Saadat et al. |
| 2005/0256532 A1 | 11/2005 | Nayak et al. |
| 2005/0267478 A1 | 12/2005 | Corradi et al. |
| 2005/0273138 A1 | 12/2005 | To et al. |
| 2005/0288778 A1 | 12/2005 | Shaoulian et al. |
| 2006/0004442 A1 | 1/2006 | Spenser et al. |
| 2006/0004443 A1 | 1/2006 | Liddicoat et al. |
| 2006/0020326 A9 | 1/2006 | Bolduc et al. |
| 2006/0020327 A1 | 1/2006 | Lashinski et al. |
| 2006/0020333 A1 | 1/2006 | Lashinski et al. |
| 2006/0020336 A1 | 1/2006 | Liddicoat |
| 2006/0025787 A1 | 2/2006 | Morales et al. |
| 2006/0025858 A1 | 2/2006 | Alameddine |
| 2006/0030885 A1 | 2/2006 | Hyde |
| 2006/0041319 A1 | 2/2006 | Taylor et al. |
| 2006/0069429 A1 | 3/2006 | Spence et al. |
| 2006/0074486 A1 | 4/2006 | Liddicoat et al. |
| 2006/0085012 A1 | 4/2006 | Dolan |
| 2006/0095009 A1 | 5/2006 | Lampropoulos et al. |
| 2006/0095116 A1 | 5/2006 | Bolduc et al. |
| 2006/0106423 A1 | 5/2006 | Weisel et al. |
| 2006/0116757 A1 | 6/2006 | Lashinski et al. |
| 2006/0122633 A1 | 6/2006 | To et al. |
| 2006/0129166 A1 | 6/2006 | Lavelle |
| 2006/0142694 A1 | 6/2006 | Bednarek et al. |
| 2006/0149280 A1 | 7/2006 | Harvie et al. |
| 2006/0149368 A1 | 7/2006 | Spence |
| 2006/0161265 A1 | 7/2006 | Levine et al. |
| 2006/0173251 A1 | 8/2006 | Govari et al. |
| 2006/0184240 A1 | 8/2006 | Jimenez et al. |
| 2006/0184242 A1 | 8/2006 | Lichtenstein |
| 2006/0195134 A1 | 8/2006 | Crittenden |
| 2006/0206203 A1 | 9/2006 | Yang et al. |
| 2006/0212048 A1 | 9/2006 | Crainich |
| 2006/0241622 A1 | 10/2006 | Zergiebel |
| 2006/0241656 A1 | 10/2006 | Starksen et al. |
| 2006/0241748 A1 | 10/2006 | Lee et al. |
| 2006/0247763 A1 | 11/2006 | Slater |
| 2006/0259135 A1 | 11/2006 | Navia et al. |
| 2006/0271175 A1 | 11/2006 | Woolfson et al. |
| 2006/0276871 A1 | 12/2006 | Lamson et al. |
| 2006/0282161 A1 | 12/2006 | Huynh et al. |
| 2006/0287661 A1 | 12/2006 | Bolduc et al. |
| 2006/0287716 A1 | 12/2006 | Banbury et al. |
| 2007/0001627 A1 | 1/2007 | Lin et al. |
| 2007/0005069 A1* | 1/2007 | Contiliano ......... A61B 17/0401 606/304 |
| 2007/0010800 A1 | 1/2007 | Weitzner et al. |
| 2007/0016287 A1 | 1/2007 | Cartledge et al. |
| 2007/0016288 A1 | 1/2007 | Gurskis et al. |
| 2007/0021781 A1 | 1/2007 | Jervis et al. |
| 2007/0027533 A1 | 2/2007 | Douk |
| 2007/0027536 A1 | 2/2007 | Mihaljevic et al. |
| 2007/0032823 A1 | 2/2007 | Tegg |

(56) References Cited

U.S. PATENT DOCUMENTS

| | | |
|---|---|---|
| 2007/0038221 A1 | 2/2007 | Fine et al. |
| 2007/0038293 A1 | 2/2007 | St.Goar et al. |
| 2007/0038296 A1 | 2/2007 | Navia et al. |
| 2007/0039425 A1 | 2/2007 | Wang |
| 2007/0049942 A1* | 3/2007 | Hindrichs ............ A61F 2/2451 623/13.14 |
| 2007/0049970 A1 | 3/2007 | Belef et al. |
| 2007/0051377 A1 | 3/2007 | Douk et al. |
| 2007/0055206 A1 | 3/2007 | To et al. |
| 2007/0060922 A1 | 3/2007 | Dreyfuss |
| 2007/0061010 A1 | 3/2007 | Hauser et al. |
| 2007/0066863 A1 | 3/2007 | Rafiee et al. |
| 2007/0078297 A1 | 4/2007 | Rafiee et al. |
| 2007/0080188 A1 | 4/2007 | Spence et al. |
| 2007/0083168 A1 | 4/2007 | Whiting et al. |
| 2007/0083235 A1 | 4/2007 | Jervis et al. |
| 2007/0100427 A1 | 5/2007 | Perouse |
| 2007/0106328 A1 | 5/2007 | Wardle et al. |
| 2007/0112359 A1 | 5/2007 | Kimura et al. |
| 2007/0112422 A1 | 5/2007 | Dehdashtian |
| 2007/0112425 A1 | 5/2007 | Schaller et al. |
| 2007/0118151 A1 | 5/2007 | Davidson |
| 2007/0118154 A1 | 5/2007 | Crabtree |
| 2007/0118213 A1 | 5/2007 | Loulmet |
| 2007/0118215 A1 | 5/2007 | Moaddeb |
| 2007/0142907 A1 | 6/2007 | Moaddeb et al. |
| 2007/0162111 A1 | 7/2007 | Fukamachi et al. |
| 2007/0173931 A1 | 7/2007 | Tremulis et al. |
| 2007/0198082 A1 | 8/2007 | Kapadia et al. |
| 2007/0219558 A1 | 9/2007 | Deutsch |
| 2007/0239208 A1 | 10/2007 | Crawford |
| 2007/0244554 A1 | 10/2007 | Rafiee et al. |
| 2007/0244556 A1 | 10/2007 | Rafiee et al. |
| 2007/0255397 A1 | 11/2007 | Ryan et al. |
| 2007/0255400 A1 | 11/2007 | Parravicini et al. |
| 2007/0270755 A1 | 11/2007 | Von et al. |
| 2007/0276437 A1 | 11/2007 | Call et al. |
| 2007/0282375 A1 | 12/2007 | Hindrichs et al. |
| 2007/0282429 A1 | 12/2007 | Hauser et al. |
| 2007/0295172 A1 | 12/2007 | Swartz |
| 2007/0299424 A1 | 12/2007 | Cumming et al. |
| 2008/0004697 A1 | 1/2008 | Lichtenstein et al. |
| 2008/0027483 A1 | 1/2008 | Cartledge et al. |
| 2008/0027555 A1 | 1/2008 | Hawkins |
| 2008/0033460 A1 | 2/2008 | Ziniti et al. |
| 2008/0035160 A1 | 2/2008 | Woodson et al. |
| 2008/0039935 A1 | 2/2008 | Buch et al. |
| 2008/0051703 A1 | 2/2008 | Thornton et al. |
| 2008/0058595 A1 | 3/2008 | Snoke et al. |
| 2008/0065011 A1 | 3/2008 | Marchand et al. |
| 2008/0065204 A1 | 3/2008 | Macoviak et al. |
| 2008/0071366 A1 | 3/2008 | Tuval et al. |
| 2008/0086138 A1 | 4/2008 | Stone et al. |
| 2008/0086203 A1 | 4/2008 | Roberts |
| 2008/0091169 A1 | 4/2008 | Heideman et al. |
| 2008/0091257 A1 | 4/2008 | Andreas et al. |
| 2008/0097483 A1 | 4/2008 | Ortiz et al. |
| 2008/0097523 A1 | 4/2008 | Bolduc et al. |
| 2008/0103572 A1 | 5/2008 | Gerber |
| 2008/0140116 A1 | 6/2008 | Bonutti |
| 2008/0167713 A1 | 7/2008 | Bolling |
| 2008/0167714 A1 | 7/2008 | St Goar et al. |
| 2008/0177380 A1 | 7/2008 | Starksen et al. |
| 2008/0195126 A1 | 8/2008 | Solem |
| 2008/0195200 A1 | 8/2008 | Vidlund et al. |
| 2008/0208265 A1 | 8/2008 | Frazier et al. |
| 2008/0221672 A1 | 9/2008 | Lamphere et al. |
| 2008/0228030 A1 | 9/2008 | Godin |
| 2008/0228223 A1 | 9/2008 | Alkhatib |
| 2008/0234729 A1 | 9/2008 | Page et al. |
| 2008/0262480 A1 | 10/2008 | Stahler et al. |
| 2008/0262609 A1 | 10/2008 | Gross et al. |
| 2008/0275300 A1 | 11/2008 | Rothe et al. |
| 2008/0275469 A1 | 11/2008 | Fanton et al. |
| 2008/0275551 A1 | 11/2008 | Alfieri |
| 2008/0281353 A1 | 11/2008 | Aranyi et al. |
| 2008/0281411 A1 | 11/2008 | Berreklouw |
| 2008/0287862 A1 | 11/2008 | Weitzner et al. |
| 2008/0288044 A1 | 11/2008 | Osborne |
| 2008/0288062 A1 | 11/2008 | Andrieu et al. |
| 2008/0294251 A1 | 11/2008 | Annest et al. |
| 2008/0300537 A1 | 12/2008 | Bowman |
| 2008/0300629 A1 | 12/2008 | Surti |
| 2008/0312506 A1 | 12/2008 | Spivey et al. |
| 2009/0024110 A1 | 1/2009 | Heideman et al. |
| 2009/0028670 A1 | 1/2009 | Garcia et al. |
| 2009/0043381 A1 | 2/2009 | Macoviak et al. |
| 2009/0054723 A1 | 2/2009 | Khairkhahan et al. |
| 2009/0054969 A1 | 2/2009 | Salahieh et al. |
| 2009/0062866 A1 | 3/2009 | Jackson |
| 2009/0076586 A1 | 3/2009 | Hauser et al. |
| 2009/0076600 A1 | 3/2009 | Quinn |
| 2009/0082797 A1 | 3/2009 | Fung et al. |
| 2009/0082828 A1 | 3/2009 | Ostroff |
| 2009/0088837 A1 | 4/2009 | Gillinov et al. |
| 2009/0093877 A1 | 4/2009 | Keidar et al. |
| 2009/0099650 A1 | 4/2009 | Bolduc et al. |
| 2009/0105816 A1 | 4/2009 | Olsen et al. |
| 2009/0125102 A1 | 5/2009 | Cartledge et al. |
| 2009/0166913 A1 | 7/2009 | Guo et al. |
| 2009/0171439 A1 | 7/2009 | Nissl |
| 2009/0177266 A1 | 7/2009 | Powell et al. |
| 2009/0177274 A1 | 7/2009 | Scorsin et al. |
| 2009/0248148 A1 | 10/2009 | Shaolian et al. |
| 2009/0254103 A1 | 10/2009 | Deutsch |
| 2009/0264994 A1 | 10/2009 | Saadat |
| 2009/0287231 A1 | 11/2009 | Brooks et al. |
| 2009/0287304 A1 | 11/2009 | Dahlgren et al. |
| 2009/0299409 A1 | 12/2009 | Coe et al. |
| 2009/0326648 A1 | 12/2009 | Machold et al. |
| 2010/0001038 A1 | 1/2010 | Levin et al. |
| 2010/0010538 A1 | 1/2010 | Juravic et al. |
| 2010/0023118 A1 | 1/2010 | Medlock et al. |
| 2010/0030014 A1 | 2/2010 | Ferrazzi |
| 2010/0030328 A1 | 2/2010 | Seguin et al. |
| 2010/0042147 A1 | 2/2010 | Janovsky et al. |
| 2010/0049213 A1 | 2/2010 | Serina et al. |
| 2010/0063542 A1 | 3/2010 | Van Der et al. |
| 2010/0063550 A1 | 3/2010 | Felix et al. |
| 2010/0076499 A1 | 3/2010 | Mcnamara et al. |
| 2010/0094248 A1 | 4/2010 | Nguyen et al. |
| 2010/0094314 A1 | 4/2010 | Hernlund et al. |
| 2010/0106141 A1 | 4/2010 | Osypka et al. |
| 2010/0114180 A1 | 5/2010 | Rock et al. |
| 2010/0121349 A1 | 5/2010 | Meier et al. |
| 2010/0121435 A1 | 5/2010 | Subramanian et al. |
| 2010/0121437 A1 | 5/2010 | Subramanian et al. |
| 2010/0130989 A1 | 5/2010 | Bourque et al. |
| 2010/0130992 A1 | 5/2010 | Machold et al. |
| 2010/0152845 A1 | 6/2010 | Bloom et al. |
| 2010/0161042 A1 | 6/2010 | Maisano et al. |
| 2010/0161043 A1 | 6/2010 | Maisano et al. |
| 2010/0168845 A1 | 7/2010 | Wright |
| 2010/0174358 A1 | 7/2010 | Rabkin et al. |
| 2010/0179574 A1 | 7/2010 | Longoria et al. |
| 2010/0217184 A1 | 8/2010 | Koblish et al. |
| 2010/0217382 A1 | 8/2010 | Chau et al. |
| 2010/0234935 A1 | 9/2010 | Bashiri et al. |
| 2010/0249497 A1 | 9/2010 | Peine et al. |
| 2010/0249908 A1 | 9/2010 | Chau et al. |
| 2010/0249915 A1 | 9/2010 | Zhang |
| 2010/0249920 A1 | 9/2010 | Bolling et al. |
| 2010/0262232 A1 | 10/2010 | Annest |
| 2010/0262233 A1 | 10/2010 | He |
| 2010/0280605 A1 | 11/2010 | Hammer et al. |
| 2010/0286628 A1 | 11/2010 | Gross |
| 2010/0286767 A1 | 11/2010 | Zipory et al. |
| 2010/0298929 A1 | 11/2010 | Thornton et al. |
| 2010/0305475 A1 | 12/2010 | Hinchliffe et al. |
| 2010/0324598 A1 | 12/2010 | Anderson |
| 2011/0004210 A1 | 1/2011 | Johnson et al. |
| 2011/0004298 A1 | 1/2011 | Lee et al. |
| 2011/0009956 A1 | 1/2011 | Cartledge et al. |
| 2011/0011917 A1 | 1/2011 | Loulmet |

(56) References Cited

U.S. PATENT DOCUMENTS

| | | |
|---|---|---|
| 2011/0026208 A1 | 2/2011 | Utsuro et al. |
| 2011/0029066 A1 | 2/2011 | Gilad et al. |
| 2011/0035000 A1 | 2/2011 | Nieminen et al. |
| 2011/0066231 A1 | 3/2011 | Cartledge et al. |
| 2011/0067770 A1 | 3/2011 | Pederson et al. |
| 2011/0071626 A1 | 3/2011 | Wright et al. |
| 2011/0082538 A1 | 4/2011 | Dahlgren et al. |
| 2011/0087146 A1 | 4/2011 | Ryan et al. |
| 2011/0093002 A1 | 4/2011 | Rucker et al. |
| 2011/0106245 A1 | 5/2011 | Miller et al. |
| 2011/0118832 A1 | 5/2011 | Punjabi |
| 2011/0137410 A1 | 6/2011 | Hacohen |
| 2011/0144576 A1 | 6/2011 | Rothe et al. |
| 2011/0144703 A1 | 6/2011 | Krause et al. |
| 2011/0196492 A1 | 8/2011 | Lambrecht et al. |
| 2011/0202130 A1 | 8/2011 | Cartledge et al. |
| 2011/0208283 A1 | 8/2011 | Rust |
| 2011/0230941 A1 | 9/2011 | Markus |
| 2011/0230961 A1 | 9/2011 | Langer et al. |
| 2011/0238088 A1 | 9/2011 | Bolduc et al. |
| 2011/0257433 A1 | 10/2011 | Walker |
| 2011/0257633 A1 | 10/2011 | Cartledge et al. |
| 2011/0264208 A1 | 10/2011 | Duffy et al. |
| 2011/0276062 A1 | 11/2011 | Bolduc |
| 2011/0282361 A1 | 11/2011 | Miller et al. |
| 2011/0288435 A1 | 11/2011 | Christy et al. |
| 2011/0288635 A1 | 11/2011 | Miller et al. |
| 2011/0301498 A1 | 12/2011 | Maenhout et al. |
| 2012/0022557 A1 | 1/2012 | Cabiri et al. |
| 2012/0022639 A1 | 1/2012 | Hacohen et al. |
| 2012/0053628 A1 | 3/2012 | Sojka et al. |
| 2012/0053642 A1 | 3/2012 | Lozier et al. |
| 2012/0065464 A1 | 3/2012 | Ellis et al. |
| 2012/0078355 A1 | 3/2012 | Zipory et al. |
| 2012/0078359 A1 | 3/2012 | Li et al. |
| 2012/0089022 A1 | 4/2012 | House et al. |
| 2012/0089125 A1 | 4/2012 | Scheibe et al. |
| 2012/0095552 A1 | 4/2012 | Spence et al. |
| 2012/0101526 A1 | 4/2012 | Bennett |
| 2012/0109155 A1 | 5/2012 | Robinson et al. |
| 2012/0136436 A1 | 5/2012 | Cabiri et al. |
| 2012/0143226 A1 | 6/2012 | Belson et al. |
| 2012/0150290 A1 | 6/2012 | Gabbay |
| 2012/0158021 A1 | 6/2012 | Morrill |
| 2012/0158023 A1 | 6/2012 | Mitelberg et al. |
| 2012/0179086 A1 | 7/2012 | Shank et al. |
| 2012/0191182 A1 | 7/2012 | Hauser et al. |
| 2012/0197388 A1 | 8/2012 | Khairkhahan et al. |
| 2012/0226349 A1 | 9/2012 | Tuval et al. |
| 2012/0239142 A1 | 9/2012 | Liu et al. |
| 2012/0245604 A1 | 9/2012 | Tegzes |
| 2012/0245632 A1 | 9/2012 | Tsai et al. |
| 2012/0271198 A1 | 10/2012 | Whittaker et al. |
| 2012/0296349 A1 | 11/2012 | Smith et al. |
| 2012/0296417 A1 | 11/2012 | Hill et al. |
| 2012/0310330 A1 | 12/2012 | Buchbinder et al. |
| 2012/0323313 A1 | 12/2012 | Seguin |
| 2013/0030522 A1 | 1/2013 | Rowe et al. |
| 2013/0046373 A1 | 2/2013 | Cartledge et al. |
| 2013/0053884 A1 | 2/2013 | Roorda |
| 2013/0079873 A1 | 3/2013 | Migliazza et al. |
| 2013/0085529 A1 | 4/2013 | Housman |
| 2013/0090724 A1 | 4/2013 | Subramanian et al. |
| 2013/0096673 A1 | 4/2013 | Hill et al. |
| 2013/0116776 A1 | 5/2013 | Gross et al. |
| 2013/0123910 A1 | 5/2013 | Cartledge et al. |
| 2013/0131791 A1 | 5/2013 | Hlavka et al. |
| 2013/0166017 A1 | 6/2013 | Cartledge et al. |
| 2013/0190863 A1 | 7/2013 | Call et al. |
| 2013/0204361 A1 | 8/2013 | Adams et al. |
| 2013/0218206 A1 | 8/2013 | Gadlage |
| 2013/0226289 A1 | 8/2013 | Shaolian et al. |
| 2013/0226290 A1 | 8/2013 | Yellin et al. |
| 2013/0231701 A1 | 9/2013 | Voss et al. |
| 2013/0268069 A1 | 10/2013 | Zakai et al. |
| 2013/0282059 A1 | 10/2013 | Ketai et al. |
| 2013/0289718 A1 | 10/2013 | Tsukashima et al. |
| 2013/0297013 A1 | 11/2013 | Klima et al. |
| 2013/0304093 A1 | 11/2013 | Serina et al. |
| 2013/0331930 A1 | 12/2013 | Rowe et al. |
| 2014/0067054 A1 | 3/2014 | Chau et al. |
| 2014/0081394 A1 | 3/2014 | Keraenen et al. |
| 2014/0088368 A1 | 3/2014 | Park |
| 2014/0088646 A1 | 3/2014 | Wales et al. |
| 2014/0094826 A1 | 4/2014 | Sutherland et al. |
| 2014/0094903 A1 | 4/2014 | Miller et al. |
| 2014/0094906 A1 | 4/2014 | Spence et al. |
| 2014/0114390 A1 | 4/2014 | Tobis et al. |
| 2014/0135799 A1 | 5/2014 | Henderson |
| 2014/0142619 A1 | 5/2014 | Serina et al. |
| 2014/0142695 A1 | 5/2014 | Gross et al. |
| 2014/0148849 A1 | 5/2014 | Serina et al. |
| 2014/0155783 A1 | 6/2014 | Starksen et al. |
| 2014/0163608 A1 | 6/2014 | Osypka |
| 2014/0163615 A1 | 6/2014 | Gadlage et al. |
| 2014/0163670 A1 | 6/2014 | Alon et al. |
| 2014/0163690 A1 | 6/2014 | White |
| 2014/0188108 A1 | 7/2014 | Goodine et al. |
| 2014/0188140 A1 | 7/2014 | Meier et al. |
| 2014/0188215 A1 | 7/2014 | Hlavka et al. |
| 2014/0194976 A1 | 7/2014 | Starksen et al. |
| 2014/0207231 A1 | 7/2014 | Hacohen et al. |
| 2014/0243859 A1 | 8/2014 | Robinson |
| 2014/0243894 A1 | 8/2014 | Groothuis et al. |
| 2014/0243963 A1 | 8/2014 | Sheps et al. |
| 2014/0251042 A1 | 9/2014 | Asselin et al. |
| 2014/0275757 A1 | 9/2014 | Goodwin et al. |
| 2014/0276648 A1 | 9/2014 | Hammer et al. |
| 2014/0296962 A1 | 10/2014 | Cartledge et al. |
| 2014/0303649 A1 | 10/2014 | Nguyen et al. |
| 2014/0303720 A1 | 10/2014 | Sugimoto et al. |
| 2014/0309661 A1 | 10/2014 | Sheps et al. |
| 2014/0309730 A1 | 10/2014 | Alon et al. |
| 2014/0343668 A1 | 11/2014 | Zipory et al. |
| 2014/0350660 A1 | 11/2014 | Cocks et al. |
| 2014/0364906 A1* | 12/2014 | Palese ............... A61B 17/0401 606/232 |
| 2014/0379006 A1 | 12/2014 | Sutherland et al. |
| 2015/0018940 A1 | 1/2015 | Quill et al. |
| 2015/0051697 A1 | 2/2015 | Spence et al. |
| 2015/0081014 A1 | 3/2015 | Gross et al. |
| 2015/0094800 A1 | 4/2015 | Chawla |
| 2015/0100116 A1 | 4/2015 | Mohl et al. |
| 2015/0112432 A1 | 4/2015 | Reich et al. |
| 2015/0119936 A1 | 4/2015 | Gilmore et al. |
| 2015/0127097 A1 | 5/2015 | Neumann et al. |
| 2015/0133997 A1 | 5/2015 | Deitch et al. |
| 2015/0157459 A1 | 6/2015 | Macoviak et al. |
| 2015/0182336 A1 | 7/2015 | Zipory et al. |
| 2015/0230919 A1 | 8/2015 | Chau et al. |
| 2015/0272586 A1 | 10/2015 | Herman et al. |
| 2015/0272734 A1 | 10/2015 | Sheps et al. |
| 2015/0282931 A1 | 10/2015 | Brunnett et al. |
| 2015/0351910 A1 | 12/2015 | Gilmore et al. |
| 2015/0366556 A1 | 12/2015 | Khairkhahan et al. |
| 2016/0008132 A1 | 1/2016 | Cabiri et al. |
| 2016/0029920 A1 | 2/2016 | Kronstrom |
| 2016/0030034 A1 | 2/2016 | Graul et al. |
| 2016/0058557 A1 | 3/2016 | Reich et al. |
| 2016/0113767 A1 | 4/2016 | Miller et al. |
| 2016/0120642 A1 | 5/2016 | Shaolian et al. |
| 2016/0120645 A1 | 5/2016 | Alon |
| 2016/0158008 A1 | 6/2016 | Miller et al. |
| 2016/0242762 A1 | 8/2016 | Gilmore et al. |
| 2016/0256149 A1 | 9/2016 | Sampson et al. |
| 2016/0256274 A1 | 9/2016 | Hayoz |
| 2016/0262755 A1 | 9/2016 | Zipory et al. |
| 2016/0302917 A1 | 10/2016 | Schewel |
| 2016/0317302 A1 | 11/2016 | Madjarov et al. |
| 2016/0346084 A1 | 12/2016 | Taylor et al. |
| 2016/0361058 A1 | 12/2016 | Bolduc et al. |
| 2016/0361168 A1 | 12/2016 | Gross et al. |
| 2016/0361169 A1 | 12/2016 | Gross et al. |
| 2016/0374674 A1 | 12/2016 | Andrus |

(56) References Cited

U.S. PATENT DOCUMENTS

| | | |
|---|---|---|
| 2017/0000609 A1 | 1/2017 | Gross et al. |
| 2017/0042670 A1 | 2/2017 | Shaolian et al. |
| 2017/0065272 A1* | 3/2017 | Hart .................. A61B 17/0401 |
| 2017/0086975 A1 | 3/2017 | Gilmore et al. |
| 2017/0100119 A1 | 4/2017 | Baird et al. |
| 2017/0105839 A1 | 4/2017 | Subramanian et al. |
| 2017/0156719 A1 | 6/2017 | Tobis |
| 2017/0156731 A1 | 6/2017 | Mark et al. |
| 2017/0224489 A1 | 8/2017 | Starksen et al. |
| 2017/0245993 A1 | 8/2017 | Gross et al. |
| 2017/0252032 A1 | 9/2017 | Hiorth et al. |
| 2018/0000584 A1 | 1/2018 | Duffy et al. |
| 2018/0008409 A1 | 1/2018 | Kutzik et al. |
| 2018/0049875 A1 | 2/2018 | Iflah et al. |
| 2018/0092638 A1 | 4/2018 | Medema |
| 2018/0140420 A1 | 5/2018 | Hayoz et al. |
| 2018/0168803 A1 | 6/2018 | Pesce et al. |
| 2018/0228608 A1 | 8/2018 | Sheps et al. |
| 2018/0256318 A1 | 9/2018 | Khairkhahan et al. |
| 2018/0256334 A1 | 9/2018 | Sheps et al. |
| 2018/0280019 A1 | 10/2018 | Azar et al. |
| 2018/0289480 A1 | 10/2018 | D'Ambra et al. |
| 2018/0318080 A1 | 11/2018 | Quill et al. |
| 2018/0318083 A1 | 11/2018 | Bolling et al. |
| 2018/0368826 A1 | 12/2018 | Bonutti et al. |
| 2019/0029498 A1 | 1/2019 | Mankowski et al. |
| 2019/0038411 A1 | 2/2019 | Alon |
| 2019/0076249 A1 | 3/2019 | Khairkhahan et al. |
| 2019/0076664 A1 | 3/2019 | Ollivier |
| 2019/0091022 A1 | 3/2019 | Yellin et al. |
| 2019/0091445 A1 | 3/2019 | House |
| 2019/0111239 A1 | 4/2019 | Bolduc et al. |
| 2019/0117400 A1 | 4/2019 | Medema et al. |
| 2019/0125325 A1 | 5/2019 | Sheps et al. |
| 2019/0151093 A1 | 5/2019 | Keidar et al. |
| 2019/0159898 A1 | 5/2019 | Kutzik et al. |
| 2019/0175344 A1 | 6/2019 | Khairkhahan |
| 2019/0175345 A1 | 6/2019 | Schaffner |
| 2019/0175346 A1 | 6/2019 | Schaffner |
| 2019/0183648 A1 | 6/2019 | Trapp et al. |
| 2019/0240023 A1 | 8/2019 | Spence et al. |
| 2019/0290260 A1 | 9/2019 | Caffes et al. |
| 2019/0290431 A1 | 9/2019 | Genovese et al. |
| 2019/0321049 A1 | 10/2019 | Herman et al. |
| 2019/0343506 A1* | 11/2019 | Karapetian ........ A61B 17/0482 |
| 2019/0343633 A1 | 11/2019 | Garvin et al. |
| 2020/0015810 A1 | 1/2020 | Piccirillo |
| 2020/0015971 A1 | 1/2020 | Brauon et al. |
| 2020/0163766 A9 | 5/2020 | Tobis |
| 2020/0178956 A1 | 6/2020 | Mitelberg et al. |
| 2020/0222186 A1 | 7/2020 | Edmiston |
| 2020/0289267 A1 | 9/2020 | Peleg et al. |
| 2020/0337840 A1 | 10/2020 | Reich |
| 2020/0390551 A1 | 12/2020 | McCarthy |
| 2021/0052387 A1 | 2/2021 | Greenan et al. |
| 2021/0059820 A1 | 3/2021 | Clark et al. |
| 2021/0085461 A1 | 3/2021 | Neumark et al. |
| 2021/0093453 A1 | 4/2021 | Peleg et al. |
| 2021/0145584 A1 | 5/2021 | Kasher et al. |
| 2022/0071620 A1 | 3/2022 | Brauon et al. |
| 2022/0096232 A1 | 3/2022 | Skaro et al. |
| 2022/0110656 A1 | 4/2022 | Azar et al. |
| 2022/0142779 A1 | 5/2022 | Sharon |
| 2022/0176076 A1 | 6/2022 | Keidar |
| 2022/0233316 A1 | 7/2022 | Sheps et al. |
| 2022/0273436 A1 | 9/2022 | Aviv et al. |
| 2022/0313438 A1 | 10/2022 | Chappel-Ram |
| 2022/0323221 A1 | 10/2022 | Sharon et al. |
| 2023/0016867 A1 | 1/2023 | Tennenbaum |
| 2023/0218291 A1 | 7/2023 | Zarbatany et al. |
| 2023/0320856 A1 | 10/2023 | Zarbatany et al. |
| 2024/0008985 A1 | 1/2024 | Yuan et al. |
| 2024/0099736 A1 | 3/2024 | Elsheikh et al. |

FOREIGN PATENT DOCUMENTS

| | | | |
|---|---|---|---|
| EP | 1486171 A1 * | 12/2004 | ......... A61B 17/0401 |
| EP | 1034753 B1 | 2/2005 | |
| EP | 1827577 | 9/2008 | |
| EP | 2889019 A1 * | 7/2015 | ........... A61B 17/064 |
| EP | 3085312 B1 * | 4/2018 | ......... A61B 17/0401 |
| EP | 3531975 B1 | 5/2020 | |
| WO | WO-1992005093 A1 | 4/1992 | |
| WO | WO-1998046149 A1 | 10/1998 | |
| WO | WO-02068016 A2 * | 9/2002 | ......... A61B 17/0401 |
| WO | WO-2002085250 A2 | 10/2002 | |
| WO | WO-2003047467 A1 | 6/2003 | |
| WO | WO-2006055516 A2 * | 5/2006 | ......... A61B 17/0401 |
| WO | WO-2007098512 A1 | 9/2007 | |
| WO | WO-2010000454 A1 | 1/2010 | |
| WO | WO 2011154942 | 12/2011 | |
| WO | WO-2012176195 A2 | 12/2012 | |
| WO | WO-2014064964 A1 | 5/2014 | |
| WO | WO-2019182645 A1 | 9/2019 | |
| WO | WO-2022064401 A2 | 3/2022 | |
| WO | WO-2022090907 A1 | 5/2022 | |
| WO | WO-2022101817 A2 | 5/2022 | |
| WO | WO-2022153131 A1 | 7/2022 | |
| WO | WO-2022157592 A1 | 7/2022 | |
| WO | WO-2022172108 A1 | 8/2022 | |
| WO | WO-2022172149 A1 | 8/2022 | |
| WO | WO-2022200972 A1 | 9/2022 | |
| WO | WO-2022224071 A1 | 10/2022 | |
| WO | WO-2022229815 A1 | 11/2022 | |
| WO | WO-2022250983 A1 | 12/2022 | |

OTHER PUBLICATIONS

Patent Cooperation Treaty, International Search Report and Written Opinion, Application No. PCT/US2020/041899, dated Jan. 11, 2021, in 30 pages.
Patent Cooperation Treaty, Invitation to Pay Additional Fees, Application No. PCT/US2020/041899, dated Oct. 29, 2020, in 25 pages.
Patent Cooperation Treaty, Invitation to Pay Additional Fees, Application No. PCT/US2020/041899, dated Oct. 29, 2020, in 24 pages.
Agarwal S., et al., "Interventional Cardiology Perspective Functional Tricuspid Regurgitation," Circulation: Cardiovascular Interventions, 2009, vol. 2, No. 2, pp. 565-573 (11 Pages).
Ahmadi A., et al., "Hemodynamic Changes Following Experimental Production and Correction of Acute Mitral Regurgitation With an Adjustable Ring Prosthesis," The Thoracic and Cardiovascular Surgeon, 1988, vol. 36, No. 6, pp. 313-319.
Ahmadi A., et al., "Percutaneously Adjustable Pulmonary Artery Band," The Annals of Thoracic Surgery, 1995, vol. 60, pp. S520-S522.
Alfieri O., et al., "An Effective Technique to Correct Anterior Mitral Leaflet Prolapse," Journal of Cardiac Surgery, 1999, vol. 14, No. 6, pp. 468-470.
Alfieri O., et al., "Novel Suture Device for Beating-Heart Mitral Leaflet Approximation," The Annals of Thoracic Surgery, 2002, vol. 74, pp. 1488-1493.
Alfieri O., et al., "The Double Orifice Technique in Mitral Valve Repair: A Simple Solution for Complex Problems," The Journal of Thoracic and Cardiovascular Surgery, Oct. 2001, vol. 122, No. 4, pp. 674-681 (10 Pages).
Alfieri O., "The Edge-to-Edge Repair of the Mitral Valve," [Abstracts] 6th Annual NewEra Cardiac Care: Innovation & Technology, Heart Surgery Forum, 2000, pp. 103 (102-123), (22 Pages).
Amplatzer: "AGA: Amplatzer Cardiac Plug Brochure, Instructions to Use," AGA Medical Corporation, 5050 Nathan Lane North, Plymouth, MN 55442 USA, Copyright 2008-2010, 16 Pages, [Retrieved on Jan. 11, 2011].
Amplatzer: "Septal Occluder and Delivery System," A Patient Guide to the Non-surgical Closuer of the Atrial Septal Defect Using the Amplatzer Septal Occluder System, AGA Med Ca Corporation, Apr. 2008, 17 Pages.
Amplatzer: "Multifenestracted Septal Occlunder—Cribriform," Cribriform Occluder, A patient, guide to Percutaneous, Transcatheter, Atrial Septal Defect Closuer, AGA Medical Corporation, Apr. 2008, 10 Pages.

(56) References Cited

OTHER PUBLICATIONS

Assad R.S., "Adjustable Pulmonary Artery Banding," InTech, 2014, pp. 149-179 (32 Pages).
Brennan J., "510(k) Summary of Safety and Effectiveness," Department of Health & Human Services, May 14, 2009, 6 Pages, (Jan. 19, 2008).
Dabritz S., et al., "Experience with an Adjustable Pulmonary Artery Banding Device in Two Cases: Initial Success—Midterm Failure," The Thoracic and Cardiovascular Surgeon, 1999, vol. 47, pp. 51-52.
Dang N.C., et al., "Simplified Placement of Multiple Artificial Mitral Valve Chords," The Heart Surgery Forum #2005-1005, 2005, vol. 8, No. 3, pp. E129-E131.
Dictionary: Definition of "Lock," Dictionary.com, Jul. 29, 2013, 10 Pages.
Dieter R.S., "Percutaneous Valve Repair: Update on Mitral Regurgitation and Endovascular Approaches to the Mitral Valve," Applications in Imaging, Cardiac Interventions, Supported by an Educational Grant From Amersham Health, 2003, pp. 11-14.
Elliott D.S., et al., "An Implantable Mechanical Urinary Sphincter: A New Nonhydraulic Design Concept," Urology, 1998, vol. 52, No. 6, pp. 1151-1154.
Langer F., et al., "Ring Plus String: Papillary Muscle Repositioning as an Adjunctive Repair Technique for Ischemic Mitral Regurgitation," The Journal of Thoracic Cardiovascular Surgery, Jan. 2007, vol. 133, No. 1, pp. 247-249.
Langer F., "Ring+String, Successful Repair Technique for Ischemic Intral Regurgitation with Severe Leaflet Tethering," The Department of Thoracic Cardiovascular surgery, Hamburg, Germany, Sep. 15, 2009, pp. S85-S91 (10 Pages), Nov. 8-12, 2008.
Maisano F., et al., "The Double-orifice Technique as a Standardized Approach to Treat Mitral Regurgitation Due to Severe Myxomatous Disease: Surgical Technique," European Journal of Cardiothoracic Surgery, 2000, vol. 17, pp. 201-205 (7 Pages).
Odell J.A., et al., "Early Results of a Simplified Method of Mitral Valve Annuloplasty," Circulation, 1995, vol. 92, pp. 150-154, 13 Pages.
O'Reilly S et al., "Heart Valve Surgery Pushes the Envelope," Medtech Insight, Mar. 2006, vol. 8, No. 3, pp. 99 (73-108).
Park S.C., et al., "A Percutaneously Adjustable Device for Banding of the Pulmonary Trunk." International Journal of Cardiology, 1985, vol. 9, No. 4, pp. 477-484.
Swain C.P., et al., "An Endoscopically Deliverable Tissue-transfixing Device for Securing Biosensors in the Gastrointestinal Tract," Gastrointestinal Endoscopy, 1994, vol. 40, No. 6, pp. 730-734.
Swenson O., "An Experimental Implantable Urinary Sphincter," Journal—Invest Urol, Sep. 1976, vol. 14, No. 2, pp. 100-103.
Swenson O., et al., "An Improved Mechanical Device for Control of Urinary Incontinence," Investigative Urology, Mar. 1978, vol. 15, No. 5, pp. 389-391.
Swenson O., "Internal Device for Control of Urinary Incontinence," Journal of Pediatric Surgery, Oct.-Nov. 1972, vol. 7, No. 5, pp. 542-545.
Tajik A.J., et al., "Two-Dimensional Real-time Ultrasonic Imaging of the Heart and Great Vessels," Mayo Clinic Proceedings, May 1978, vol. 53, pp. 271-303, (05 pages).

\* cited by examiner

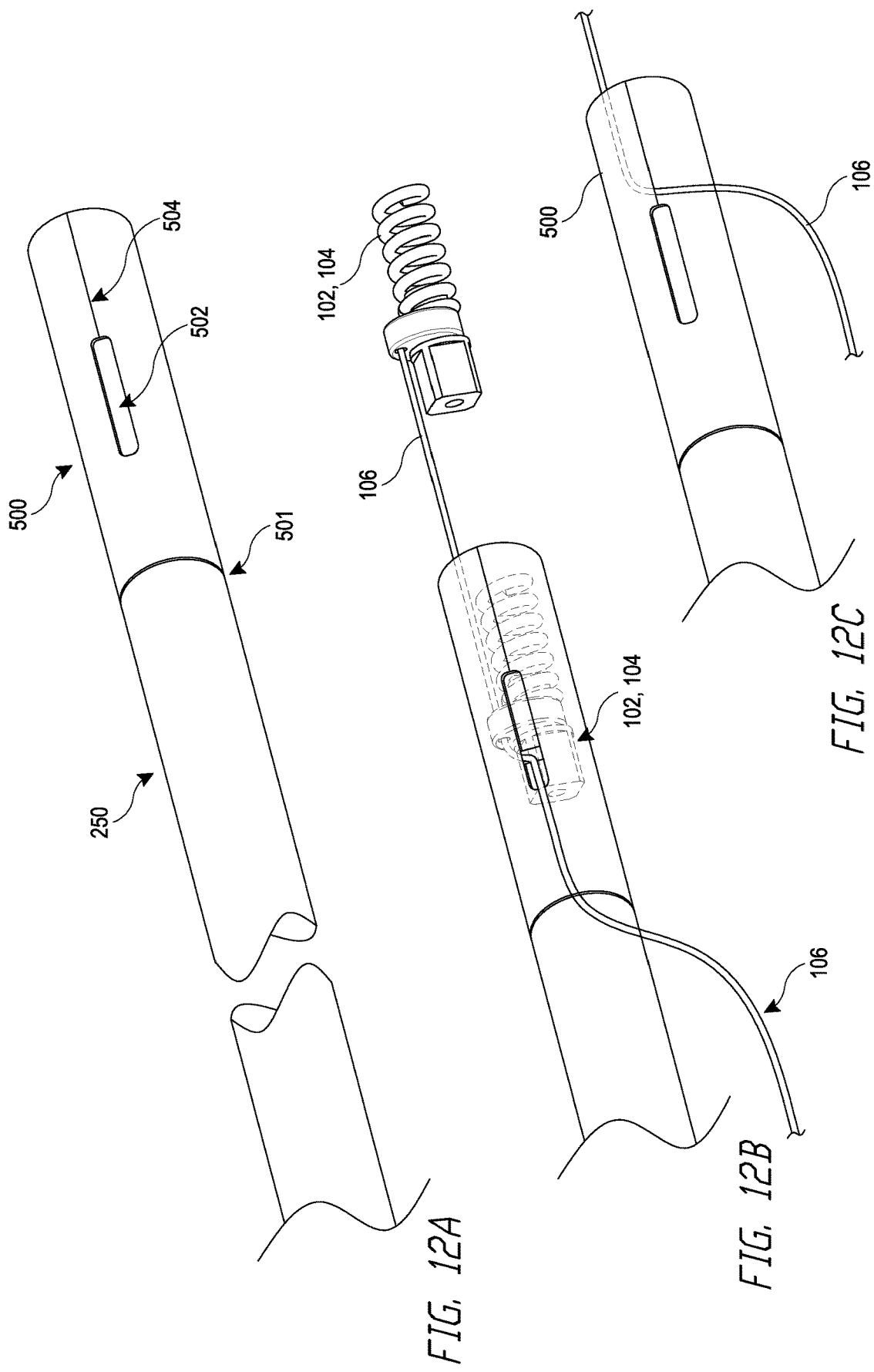

TISSUE REMODELING SYSTEMS AND METHODS

BACKGROUND

Field

The present disclosure relates to systems and methods for remodeling tissue. In particular, the present disclosure relates to systems and methods for heart valve remodeling, such as mitral valve remodeling.

Description of Related Art

Heart valves lie at the exit of each of the four heart chambers. Heart valves work as one-way valves to prevent blood from flowing in the wrong direction. Each valve has a set of flaps, called leaflets or cusps. Valve regurgitation is when blood leaks through an incompletely closed valve, allowing blood flow in two directions during contraction. Regurgitation may be caused either due to an abnormality of the leaflets themselves (called primary regurgitation), such as valve prolapse, damaged chordae, rheumatic fever, endocarditis, trauma or congenital heart defects. On the other hand, in secondary regurgitation, the valve itself is intact and only the surrounding structures the valve leaflets insert into are abnormal, resulting in regurgitation. Examples for secondary regurgitation are history of heart attack, cardiomyopathy, prolong use of certain drugs, radiation, atrial fibrillation, etc. Regurgitation can result in congestive heart failure, which is the most common hospital admission diagnosis in the United States. Symptoms of congestive heart failure include fatigue, shortness of breath, swelling of feet and legs. Valve regurgitation leads to a vicious cycle of heart failure, arrhythmias, and worsening cardiomyopathy (weakening of the heart muscle), which results in more regurgitation.

Historically, open surgical valve repair or replacement is performed to treat diseases such as regurgitation. More recently, catheter-based technologies have been developed and introduced into clinical practice for the repair of the mitral valve. In general, repair is deemed superior to valve replacement to restore coaptation of the leaflets.

SUMMARY

The systems, methods and devices described herein have innovative aspects, no single one of which is indispensable or solely responsible for their desirable attributes. Without limiting the scope of the claims, some of the advantageous features will now be summarized.

An aspect of the present disclosure involves a system for mitral valve remodeling that includes a first tissue anchor and a second tissue anchor. The first tissue anchor is configured to be implanted into tissue at a first location at or near an annulus of a mitral valve of a patient. The first tissue anchor comprises an anchor portion, a drive portion and a suture mount portion. The anchor portion engages the tissue and is implanted by rotation about a longitudinal axis of the first tissue anchor. The drive portion is rotatably fixed with respect to the anchor portion and is configured to removably engage with a drive member of a catheter. The suture mount portion is rotatable relative to the anchor portion and the drive portion and is located between the drive portion and the anchor portion along the longitudinal axis. The second tissue anchor is configured to be implanted into tissue at a second location at or near the annulus of the mitral valve across from the first location. The second tissue anchor comprises an anchor portion, a drive portion and a suture mount portion. The anchor portion engages the tissue and is implanted by rotation about a longitudinal axis of the second tissue anchor. The drive portion is rotatably fixed with respect to the anchor portion and is configured to removably engage with the drive member of the catheter. The suture mount portion is rotatable relative to the anchor portion and the drive portion and is located between the drive portion and the anchor portion along the longitudinal axis. A suture has a tensioned portion that extends between a first suture mount location on the suture mount portion of the first tissue anchor and a second suture mount location on the suture mount portion of the second tissue anchor. The suture mount portions of the first and second tissue anchors rotate to align with one another in response to tension applied to the suture.

In an embodiment, each of the first and second suture mount locations of the first and second tissue anchors comprises a passage that accommodates the suture, wherein the tensioned portion of the suture extends from an end of the passage relatively closer to the anchor portion.

In an embodiment, a suture lock is configured to secure a portion of the suture relative to the second tissue anchor to fix a length of a tensioned portion of the suture between the first tissue anchor and the second tissue anchor.

In an embodiment, the suture lock comprises a first portion and a second portion movable relative to the first portion, wherein a lock portion of the suture is captured between the first portion and the second portion.

In an embodiment, the first portion comprises a passage, wherein the lock portion of the suture passes through the passage.

In an embodiment, the first portion of the suture lock is configured to contact the suture mount portion of the second tissue anchor to fix the length of the tensioned portion of the suture.

In an embodiment, the passage of the suture lock is aligned with a passage of the second suture mount location of the second tissue anchor when the suture lock is in contact with the second tissue anchor.

In an embodiment, the first portion of the suture lock is rotationally fixed relative to the second portion.

In an embodiment, a threaded fastener is configured to move the first portion of the suture lock relative to the second portion.

In an embodiment, the threaded fastener is configured to move the first portion of the suture lock toward and away from the second portion.

In an embodiment, a suture cutter is configured to cut the suture.

In an embodiment, the suture cutter comprises a tip having an axial slot and a radial passage, wherein the axial slot intersects the radial passage, wherein the suture passes through the radial passage, the suture cutter further comprising a blade that is movable within the slot to cut the suture.

An aspect of the present disclosure involves a system for implanting a tissue anchor in heart tissue of a patient. The system includes a delivery catheter comprising an anchor delivery tip. The tip comprises a stationary portion and a rotatable portion. The stationary portion comprises a suture passage having a first end and a second end. The rotatable portion comprises a drive portion. The system further includes a tissue anchor comprising an anchor portion, a drive portion and a suture mount portion. The anchor portion engages the heart tissue and is implanted by rotation about a longitudinal axis of the tissue anchor. The drive portion is rotatably fixed with respect to the anchor portion and is configured to removably engage with the drive portion of the catheter. The suture mount portion is rotatable relative to the anchor portion and the drive portion. A suture is secured to the suture mount portion. The tissue anchor is configured to be engaged with the delivery catheter with the drive portion of the tissue anchor engaged with the drive portion of the delivery catheter. The suture extends through the suture passage of the tip of the delivery catheter such that the suture can be tensioned to restrain the suture mount portion of the tissue anchor from rotating as the rotatable portion of the tip of the delivery catheter is rotated to rotate the drive portion and the anchor portion of the tissue anchor to thereby implant the tissue anchor into the heart tissue.

In an embodiment, the suture passage of the stationary portion is located radially outward of the rotatable portion.

In an embodiment, the suture mount portion is located between the drive portion and the anchor portion.

In an embodiment, the delivery catheter comprises a distal tip cover configured to surround the tissue anchor prior to deployment.

In an embodiment, the distal tip cover comprises a slot through which the suture passes from exterior the distal tip cover to interior the distal tip cover such that the suture can be secured to the suture mount portion.

In an embodiment, the distal tip cover comprises a slit that extends from the slot to a distal end of the distal tip cover, wherein the slit is configured such that the suture can move from the slot, pass through the slit, and be separated from the distal tip cover when the tissue anchor is deployed from the delivery catheter.

An aspect of the present disclosure involves a tissue anchor including an anchor portion comprising a helical thread configured to be implanted into bodily tissue by rotation about a longitudinal axis of the tissue anchor. The tissue anchor further includes a drive portion that is rotatably fixed with respect to the anchor portion. The drive portion is configured to removably engage with a drive member of a catheter such that rotation of the drive member rotates the drive portion and the anchor portion of the tissue anchor. The tissue anchor further includes a suture mount portion is rotatable relative to the anchor portion and the drive portion. The suture mount portion is configured to connect to a suture at a suture mount location. The suture mount portion is configured to rotate to align the suture mount location with a direction of force of the suture. The suture mount portion is located between the drive portion and the anchor portion along the longitudinal axis.

In an embodiment, the helical thread of the anchor portion is a helical coil defining a hollow interior space.

In an embodiment, the helical coil comprises a circular cross-sectional shape.

In an embodiment, the drive portion defines a radially outward-facing drive surface that is configured to engage the drive member of the catheter.

In an embodiment, the drive portion comprises a square cross-sectional shape that defines the radially outward-facing drive surface.

In an embodiment, the suture mount portion has a peripheral surface surrounding the longitudinal axis of the tissue anchor, the peripheral surface defining a geometric center of the suture mount portion, wherein an axis of rotation of the suture mount portion is spaced from the geometric center.

In an embodiment, the suture mount location is on an opposite side of the geometric center from the axis of rotation.

In an embodiment, the suture mount location comprises a passage extending through the suture mount portion in a direction substantially aligned with the longitudinal axis of the tissue anchor.

In an embodiment, a length of the anchor portion along the longitudinal axis is greater than a length of one or both of the drive portion and the suture mount portion.

In an embodiment, the length of the drive portion is greater than the length of the suture mount portion.

An aspect of the present disclosure involves a tissue anchor including an anchor portion comprising a helical thread configured to be implanted into bodily tissue by rotation about a longitudinal axis of the tissue anchor. The tissue anchor further includes a drive portion that is rotatably fixed with respect to the anchor portion. The drive portion is configured to removably engage with a drive member of a catheter such that rotation of the drive member rotates the drive portion and the anchor portion of the tissue anchor. The tissue anchor further includes a suture mount portion that is rotatable relative to the anchor portion and the drive portion. The suture mount portion is configured to connect to a suture at a suture mount location. The suture mount portion is configured to rotate to align the suture mount location with a direction of force of the suture. The suture mount portion is located above the anchor portion along the longitudinal axis. The suture mount portion has a first end surface and a second end surface opposite the first end surface. The second end surface is closer to the anchor portion than the first end surface along the longitudinal axis. The suture mount portion is configured such that suture extends from the tissue anchor at or below the second end surface.

In an embodiment, the suture mount portion is located immediately adjacent the anchor portion.

In an embodiment, the helical thread of the anchor portion is a helical coil defining a hollow interior space.

In an embodiment, the helical coil comprises a circular cross-sectional shape.

In an embodiment, the drive portion defines a radially outward-facing drive surface that is configured to engage the drive member of the catheter.

In an embodiment, the drive portion comprises a square cross-sectional shape that defines the radially outward-facing drive surface.

In an embodiment, the suture mount portion has a peripheral surface surrounding the longitudinal axis of the tissue anchor, the peripheral surface defining a geometric center of the suture mount portion, wherein an axis of rotation of the suture mount portion is spaced from the geometric center.

In an embodiment, the suture mount location is on an opposite side of the geometric center from the axis of rotation.

In an embodiment, the suture mount location comprises a passage extending through the suture mount portion from the first end surface to the second end surface in a direction substantially aligned with the longitudinal axis of the tissue anchor.

In an embodiment, a length of the anchor portion along the longitudinal axis is greater than a length of one or both of the drive portion and the suture mount portion.

In an embodiment, the length of the drive portion is greater than the length of the suture mount portion.

An aspect of the present disclosure involves a suture lock for a tissue remodeling system. The suture lock includes a first portion comprising a base flange and a hub extending in an axial direction from the base flange. The base flange comprises a suture passage configured to accommodate a suture of the tissue remodeling system. The suture lock also includes a second portion comprising an end wall and at least one side wall defining a space to slidably engage the hub of the first portion. The end wall and the at least one side wall are configured to prevent rotation of the first portion when the hub is positioned within the space. The second portion further comprising a clamping surface located adjacent an end of the suture passage of the base flange and configured to clamp a portion of the suture against the base flange to fix the suture relative to the suture lock. The second portion is movable toward and away from the first portion to selectively clamp and release the suture.

In an embodiment, the at least one sidewall comprises a first side wall and a second side wall, wherein the first and second side walls are parallel and spaced apart from one another to receive the hub therebetween.

In an embodiment, the first portion comprises a threaded cavity extending in the axial direction within the hub and the second portion comprises an opening within the end wall, the suture lock further comprising a threaded fastener that passes through the opening and threadably engages the threaded cavity, wherein the threaded fastener is configured to move the first portion toward the second portion in response to rotation in a first direction and to allow the first portion to move away from the second portion in response to rotation in a second direction.

An aspect of the present disclosure involves a method of remodeling a mitral valve. The method includes implanting, using at least one catheter, a first tissue anchor at a first location at or near an annulus of a mitral valve of a patient. The method further includes implanting, using the at least one catheter, a second tissue anchor at a second location at or near the annulus of the mitral valve of the patient across from the first location. The method also includes extending a suture between the first tissue anchor and the second tissue anchor and using the suture to move the first tissue anchor and the second tissue anchor toward one another. The method includes fixing a tension length of the suture between the first tissue anchor and the second tissue anchor using a suture lock that is lockable using the at least one catheter. The method further includes observing the function of the mitral valve and, if desired, unlocking the suture lock, increasing or decreasing the tension length of the suture, and relocking the suture lock.

In an embodiment, the method further comprises cutting an excess portion of the suture using a suture cutter.

An aspect of the present disclosure involves a method of tensioning a suture of a mitral valve remodeling system. The method includes slidably engaging a suture lock with a suture that has an end fixed to a first tissue anchor implanted at a first location at or near an annulus of the mitral valve and is slidably engaged with a second tissue anchor implanted at a second location at or near the annulus of the mitral valve. The method further includes sliding the suture lock along the suture toward the second tissue anchor using a catheter until the suture lock contacts the second tissue anchor. The method also includes applying a pulling force to the suture while holding the suture lock in contact with the second tissue anchor to tension a portion of the suture extending between the first tissue anchor and the second tissue anchor.

In an embodiment, the method further includes locking the suture lock on the suture to maintain the tension of the portion of the suture extending between the first tissue anchor and the second tissue anchor.

In an embodiment, the method further includes disengaging the catheter from the suture lock after the suture lock is locked on the suture.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

FIG. 12A is a perspective view of a portion of an alternative delivery catheter having a distal tip cover in which the tissue anchor is stowed.

FIG. 12B illustrates the tissue anchor deployed from the distal tip cover with the suture extending through a slot in the distal tip.

FIG. 12C illustrates the suture passing through a slit in the distal tip cover.

DETAILED DESCRIPTION

Figure 1:
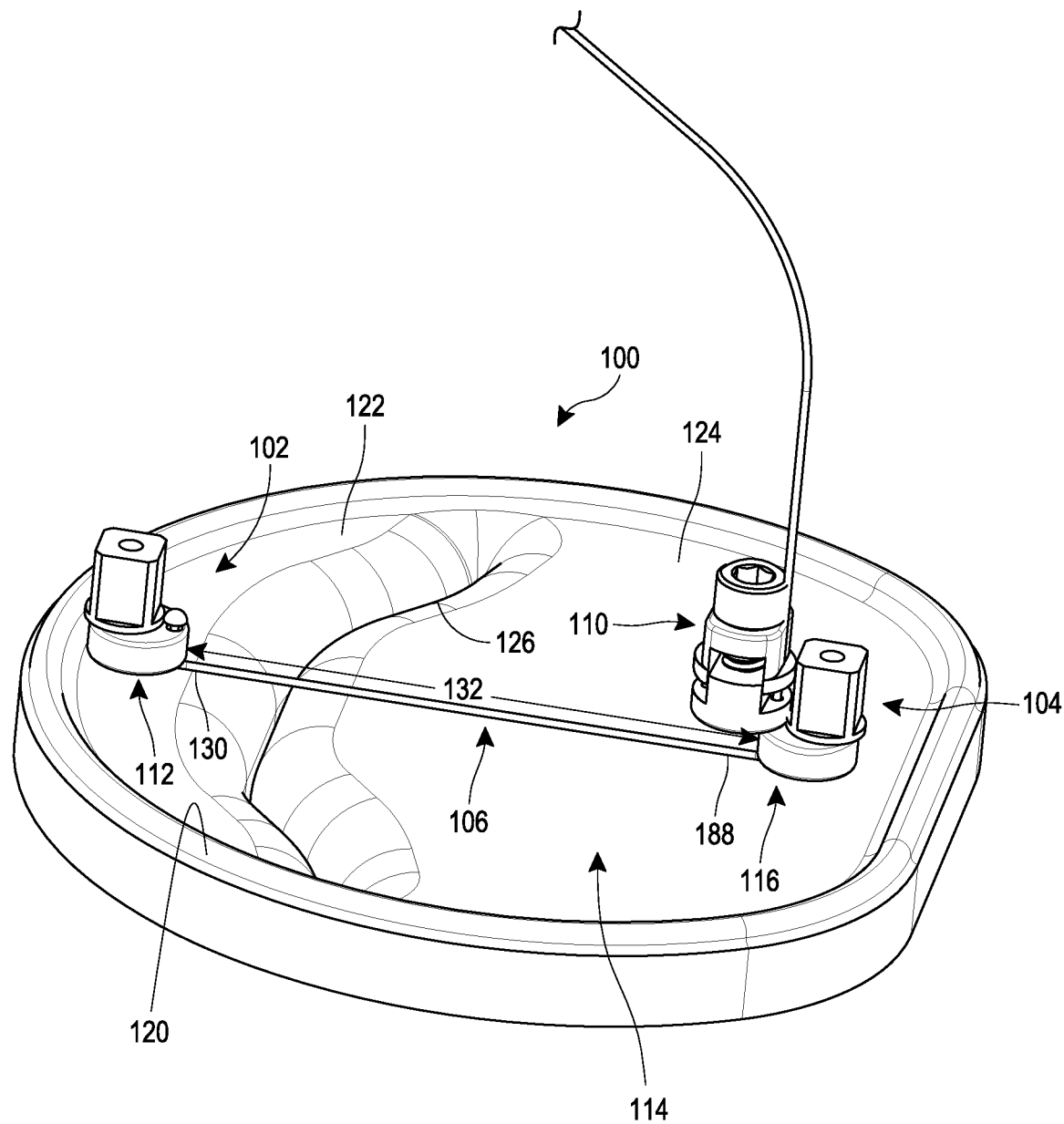
FIG. 1 is a perspective view of a mitral valve remodeling system implanted in a mitral valve of a patient.
Figure 2:
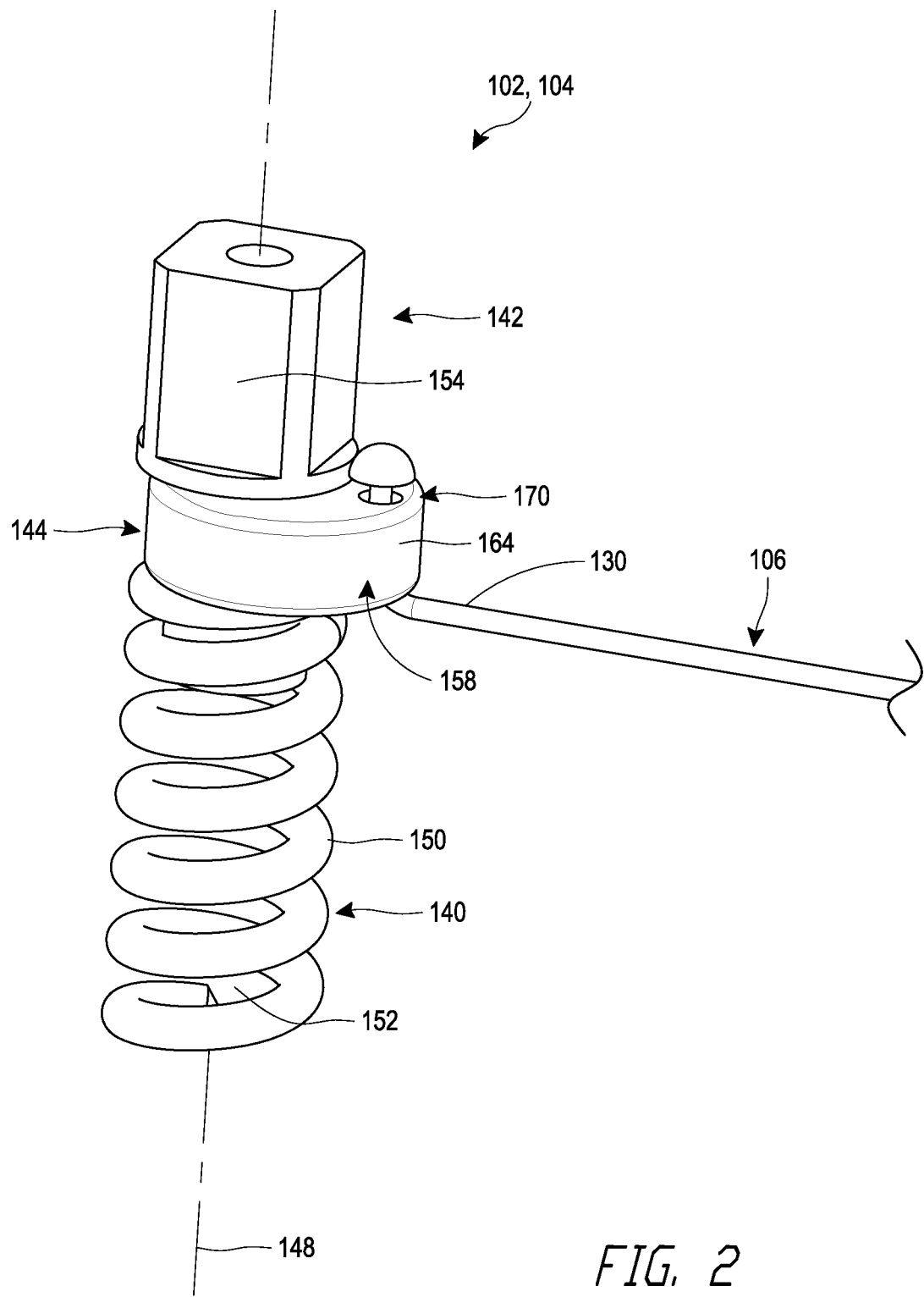
FIG. 2 is a perspective view of a tissue anchor of the system of FIG. 1.
Figure 2A:
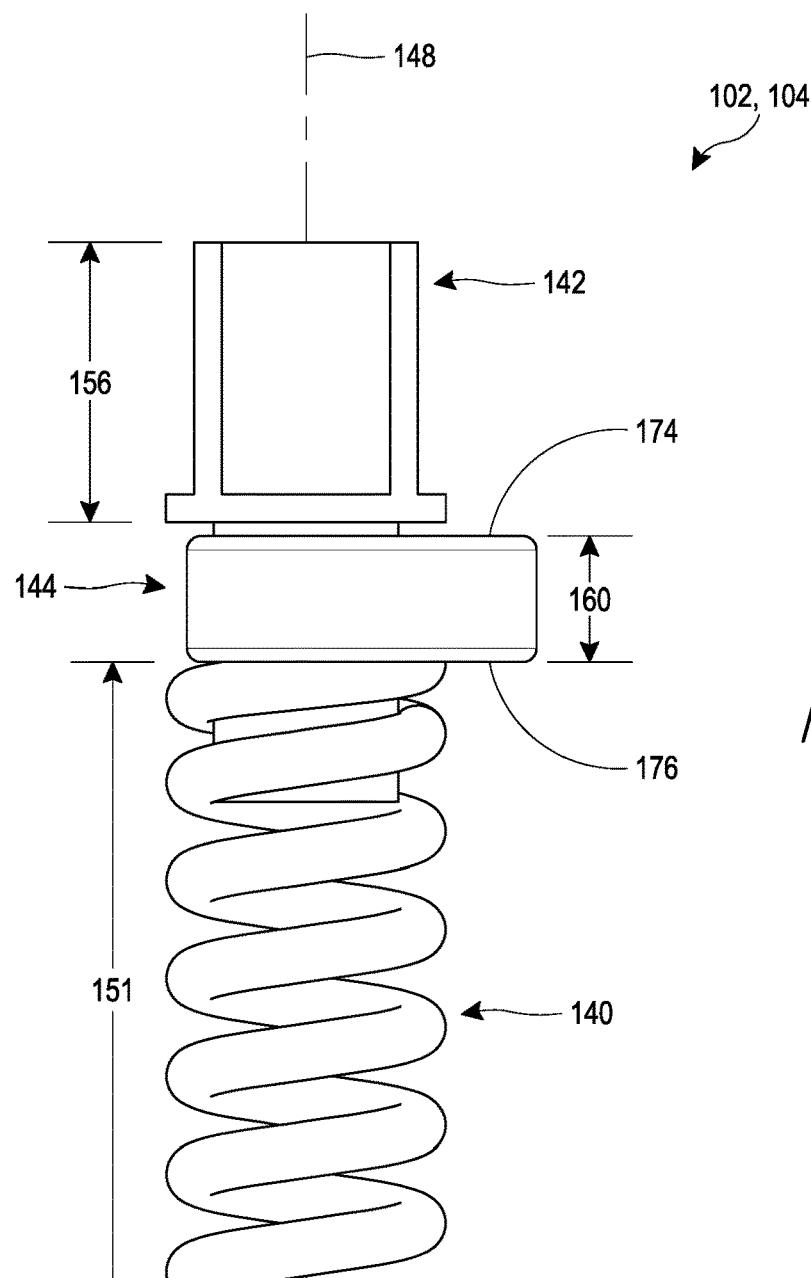
FIG. 2A is a side elevation view of the tissue anchor of FIG. 2.
Figure 2B:
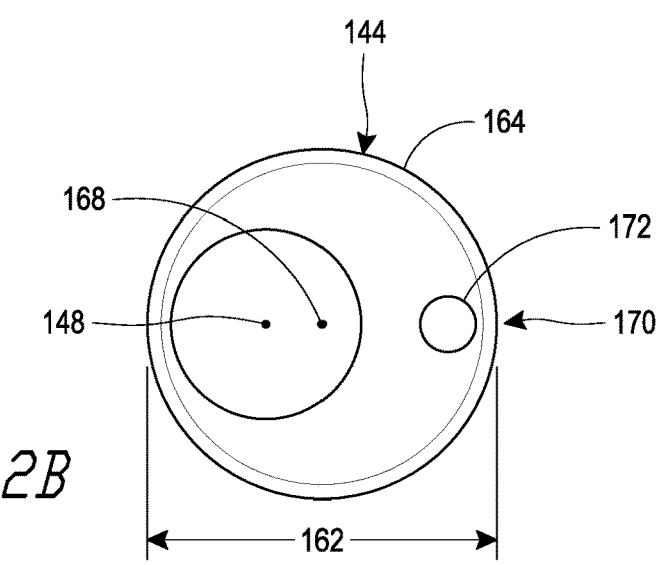
FIG. 2B is a top plan view of a suture mount portion of the tissue anchor of FIG. 2.
Figure 3:
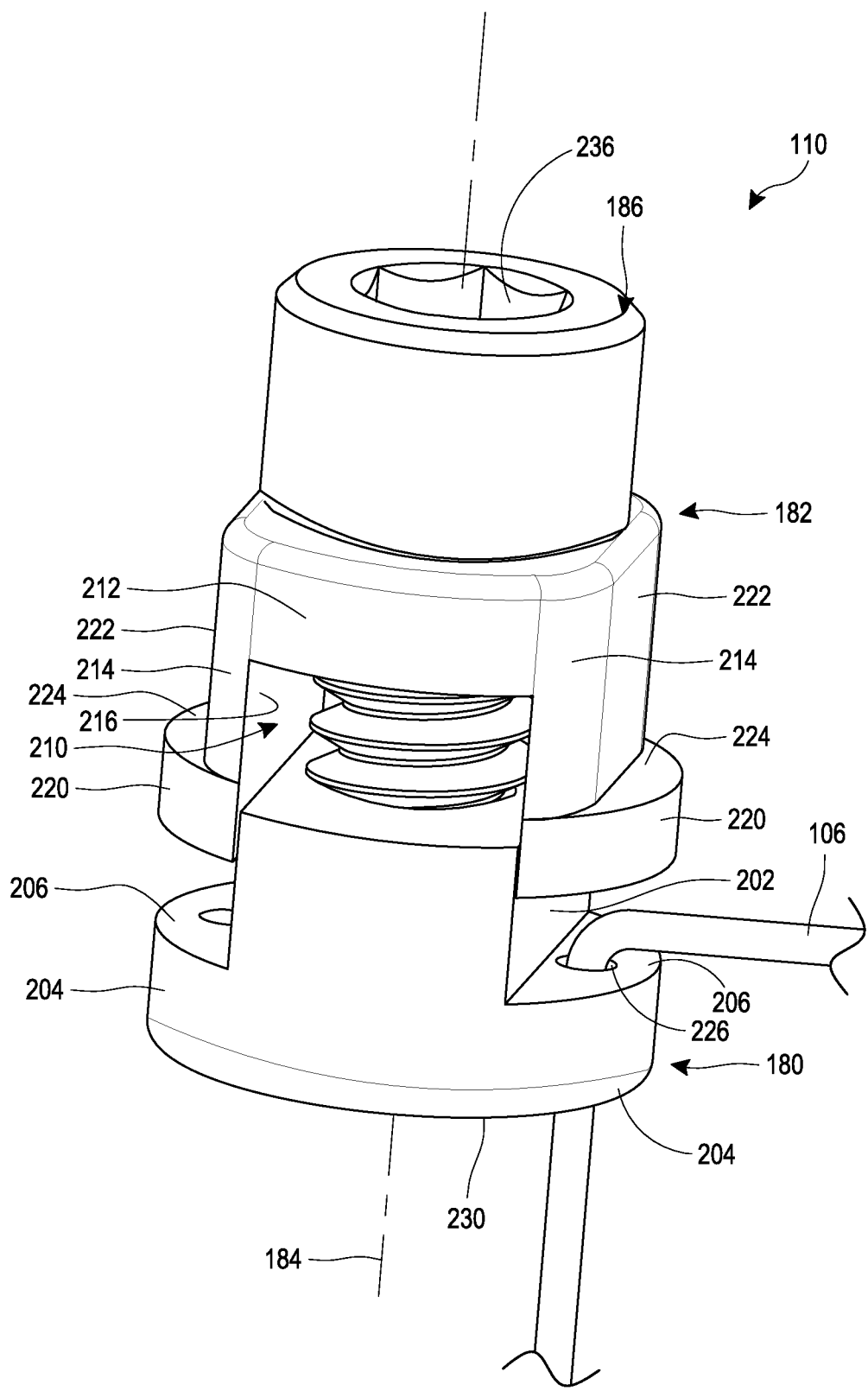
FIG. 3 is perspective view of a suture lock of the system of FIG. 1.
Figure 4:
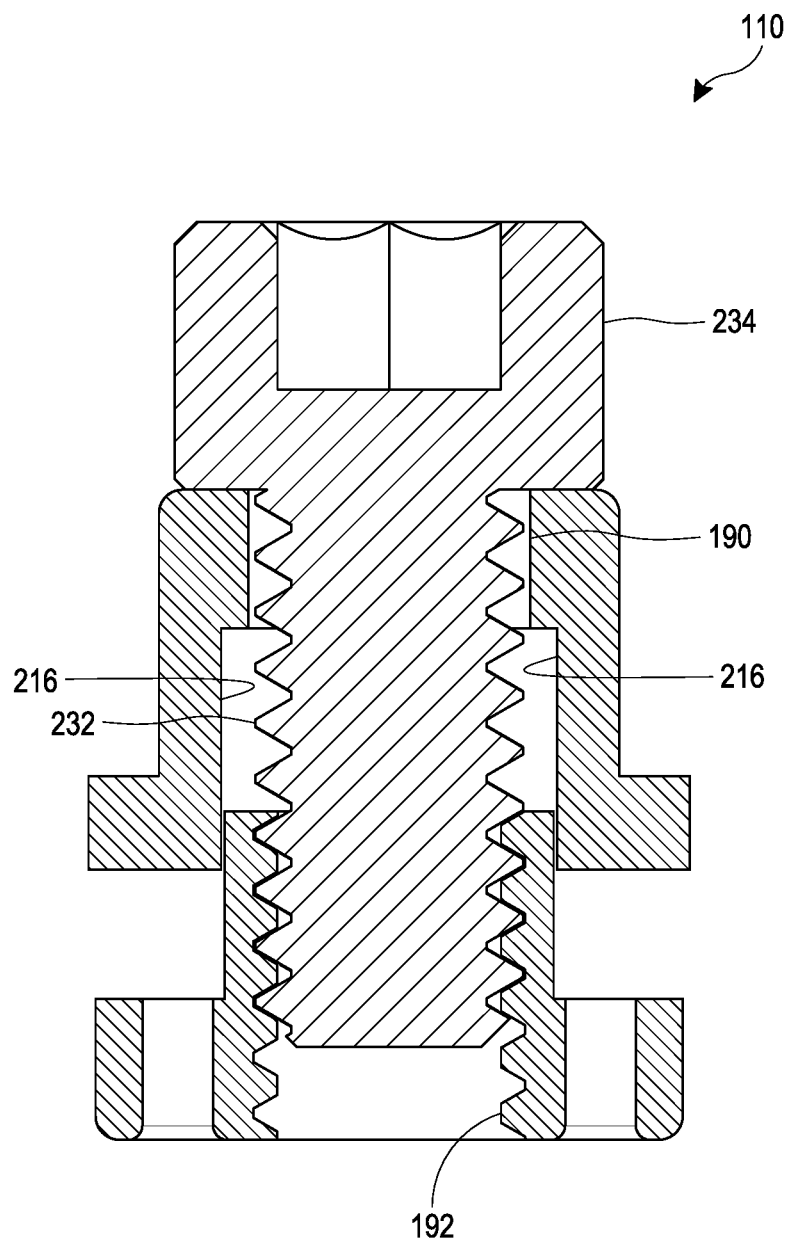
FIG. 4 is a sectional view of the suture lock of FIG. 3.
Figure 5:
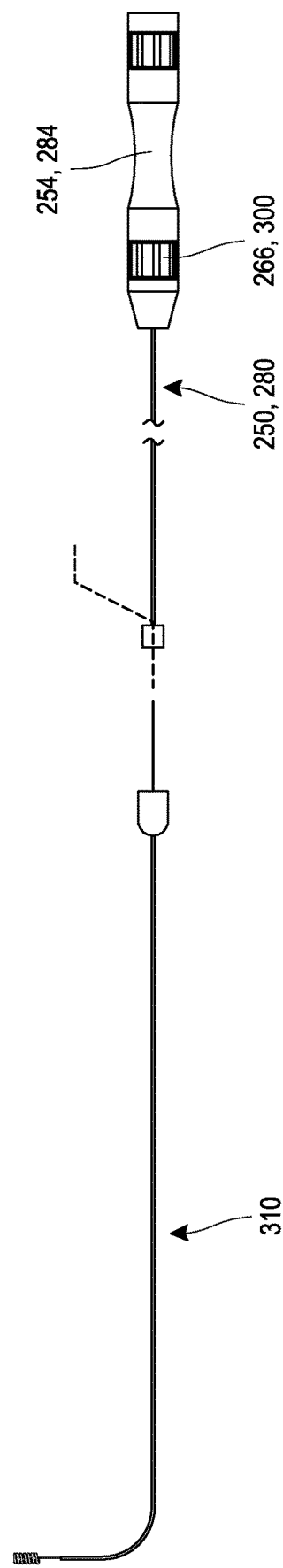
FIG. 5 is a view of a guide catheter and delivery catheter for use in implanting the system of FIG. 1.
Figure 6:
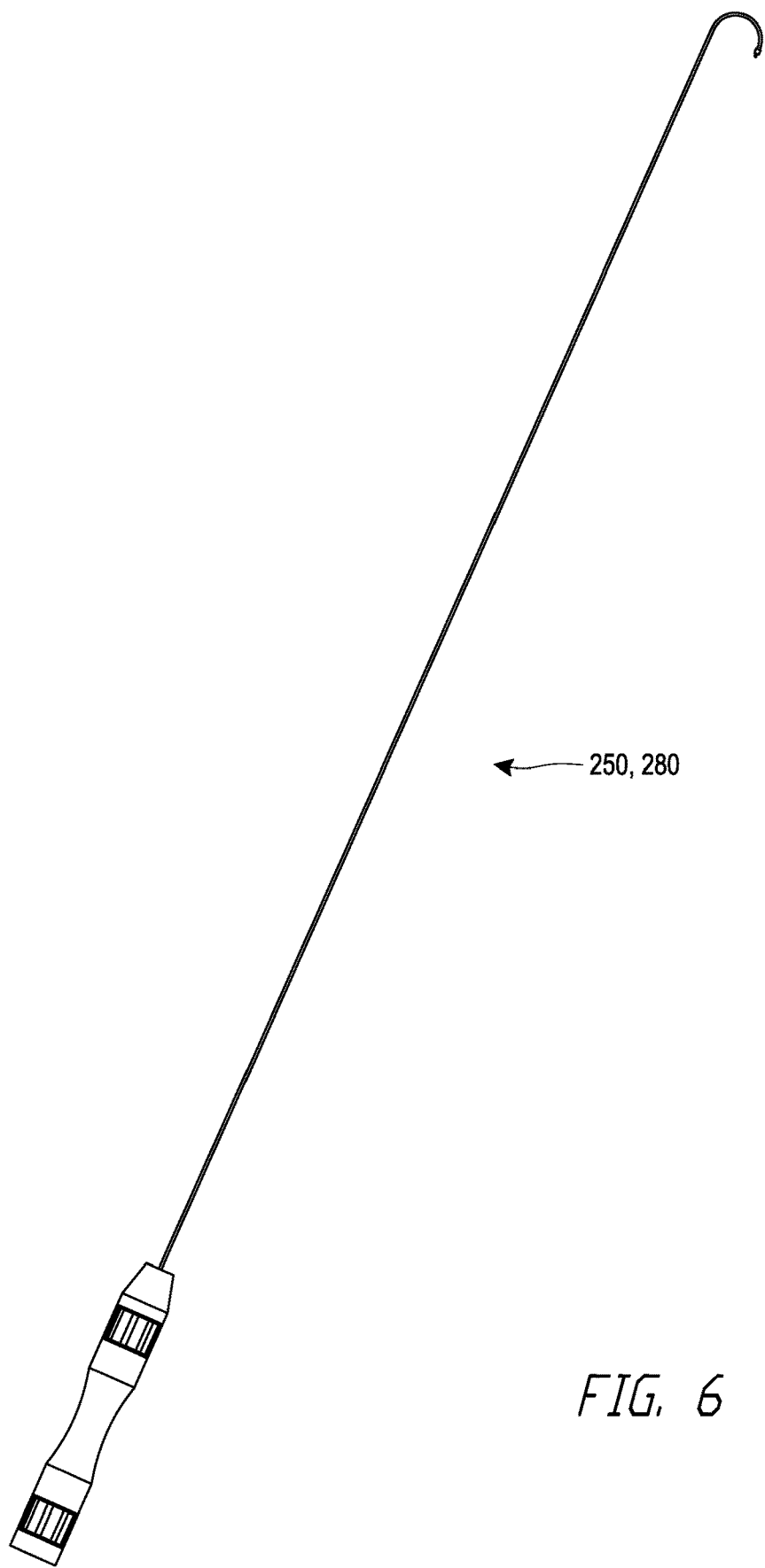
FIG. 6 is a perspective view of the delivery catheter of FIG. 5.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The percutaneous technology described in this application is designed to treat valve regurgitation by structurally changing the heart to increase leaflet coaptation. The technology may be applied to either atrio-ventricular valve of the heart (mitral and tricuspid valve). The concept of repair is an annular approach of valve repair.

There are several advantages of one or more embodiments of the technology described within this application compared to currently either commercially available or currently developed, experimental technology. Those advantages include one or more of the following:

1. In one or more embodiments, the disclosed technology allows individualization of regurgitation reduction, depending on the underlying pathology and valve size (specifically, where anchors are placed and how much the chord is tethered). From a practical point of view, the disclosed technology eliminates the need for hospitals to acquire a large range of devices of different sizes. Substantially the only equipment necessary is delivery catheters, anchors, and chord.
2. The disclosed technology conceptually may be particularly helpful in so far unstudied patient populations, such as those with secondary mitral regurgitation due to atrial pathologies or patients with tricuspid regurgitation due to pacemaker or defibrillator leads. Nevertheless, one or more embodiments of the disclosed technology may also prove effective in secondary mitral regurgitation due to ventricular disease, or even in select cases of primary mitral regurgitation.
3. In one or more embodiments, the disclosed technology may be used as an adjunct to existing technology (edge to edge repair) in cases where suboptimal results are present or anticipated.
4. Further advantages of one or more embodiments of the disclosed technology is its ability to permit other, future catheter-based valve repair or replacement strategies due to the ability to cut the repair chord.
5. As with most percutaneous repair strategies, one or more embodiments of the disclosed technology is anticipated to have a much shorter recovery time and better safety profile compared to open surgical repair or replacement.
6. Comparing the disclosed technology to other currently available or tested repair devices, the simplicity is striking. Procedure time and learning curve likely are favorable due to its simple design.
7. Finally, the smaller access of the delivery system of one or more embodiments of the disclosed technology likely will eliminate concerns about residual iatrogenic atrial septal defects following percutaneous, transseptal access for mitral valve repair and allows easy access via the right internal jugular vein for repair of the tricuspid valve.

The figures illustrate systems and methods for stabilizing or remodeling tissue. Preferably, the systems and methods disclosed are configured for remodeling soft tissue, such as heart tissue, for example. The illustrated systems and related methods are configured for remodeling the mitral valve. However, the system, components thereof and/or related methods could be used for other purposes or could be modified for use in other applications. For example, the disclosed systems, components or methods could be modified for use in stabilizing or remodeling other soft (e.g., muscle or connective tissue) or hard (e.g., bone) bodily tissues.

The illustrated systems are configured for percutaneous transvascular delivery using one or more catheters or other suitable conduits. However, in alternative arrangements or applications, the systems or components thereof as disclosed or as modified by one skilled in the art could be delivered to or installed at the desired bodily location by other means, such as by using a direct approach.

System Overview

The illustrated system 100 for remodeling a mitral valve includes a first tissue anchor 102, a second tissue anchor 104, a suture 106 and a suture lock 110. The suture 106 extends between the first tissue anchor 102 and the second tissue anchor 104. The suture 106 can be secured relative to the first tissue anchor 102 and the second tissue anchor 104 to fix a distance between the tissue anchors 102, 104. The distance between the anchors 102, 104 can be adjusted to achieve a desired level of performance of the mitral valve. The suture lock 110 secures the suture 106 relative to the second tissue anchor 104 to maintain the desired distance between the anchors 102, 104.

The first tissue anchor 102 is implanted at a first location 112 in the heart tissue of a patient, which can be at or near the mitral valve 114. The second tissue anchor 104 is implanted at a second location 116, which can be at or near the mitral valve 114. Preferably, the first tissue anchor 102 and the second tissue anchor 104 are each implanted at or near the annulus 120 of the mitral valve 114. Preferably, each of the tissue anchors 102, 104 are located close enough to the annulus 120 so that the tissue has sufficient strength to support the tissue anchors 102, 104 without tearing or otherwise being compromised under normal or expected conditions.

In the illustrated arrangement, the first tissue anchor 102 and the second tissue anchor 104, or the first location 112 and the second location 116, are located on opposite sides of the mitral valve 114. In particular, the first tissue anchor 102 is located on the posterior leaflet 122 and the second tissue anchor 104 is located on the anterior leaflet 124. However, these positions could also be reversed. The first tissue anchor 102 can be located within a central region or at or near a midpoint of the posterior leaflet 122 in a direction along the sealing edge 126 of the mitral valve 114. The second tissue anchor 104 can be located within a central region or at or near a midpoint of the anterior/posterior leaflet 124 in a direction along the sealing edge 126 of the mitral valve 114.

The suture 106 has a first end 130 that is secured to the first tissue anchor 102. As used herein, the term suture can refer to any suitable line capable of connecting the tissue anchors 102, 104 and maintaining the tissue anchors 102, 104 at the adjusted separation distance (e.g., not stretching) under the expected conditions and for the expected life of the system 100, unless otherwise indicated. The suture 106 extends from the first tissue anchor 102 to the second tissue anchor 104. The suture 106 engages the second tissue anchor 104 such that the relative movement is permitted between the suture 106 and the second tissue anchor 104. In the illustrated configuration, the suture 106 slides within or relative to the second tissue anchor 104. A length of the suture 106 located between the tissue anchors 102, 104 can be adjusted to achieve a desired distance between the tissue anchors 102, 104. The distance between the tissue anchors 102, 104 can be adjusted to achieve a desired level of remodeling of the mitral valve 114 or a desired performance of the mitral valve 114.

The suture lock 110 can be secured at a desired location along a length of a portion of the suture 106 that is not located between the tissue anchors 102, 104. The suture lock 110 can contact the second tissue anchor 104 to limit a length of the suture 106 located between the tissue anchors 102, 104. When the suture 106 is used to remodel the mitral valve 114 by moving the first location 112 closer to the second location 116, the resiliency of the tissue of the mitral valve 114 will exert a force in a direction tending to move the anchors 102, 104 apart thereby tensioning the portion of the suture 106 located between the first tissue anchor 102 and the second tissue anchor 104. Accordingly, this portion of the suture 106 can be referred to herein as the tensioned length 132. Thus, in some configurations, the suture lock 110 is held against the second tissue anchor 104 by the tension of the tensioned length 132 of the suture 106. The suture lock 110 only fixes the maximum separation distance of the first tissue anchor 102 and the second tissue anchor 104, but permits the tissue anchors 102, 104 to move closer to one another.

In some configurations, as described further below, the suture lock 110 is reversible. That is, the suture lock 110 can be secured at a location along the length of the suture 106 to define a desired tensioned length 132. The performance of the mitral valve 114 can then be observed and, if desired, the suture lock 110 can be unsecured from the suture 106, moved to another location and once again secured to the suture 106 to define a different tensioned length 132. This process can be repeated until a desired level of remodeling or performance of the mitral valve 114 is obtained.

Tissue Anchor

In some configurations, the tissue anchors 102, 104 are identical or substantially identical to one another. Accordingly, the first tissue anchor 102 is described. The second tissue anchor 104 can be identical or substantially identical, or can be of another suitable arrangement.

The illustrated tissue anchor 102 includes an anchor portion 140, a drive portion 142 and a suture mount portion 144 arranged along a longitudinal axis 148 of the tissue anchor 102. In some configurations, the suture mount portion 144 is located adjacent the anchor portion 140. In the illustrated configuration, the suture mount portion 144 is located between the anchor portion 140 and the drive portion 142 along the longitudinal axis 148.

The anchor portion 140 is configured to be implanted into tissue. Preferably, the anchor portion 140 is configured to be implanted into soft tissue, such as heart tissue. In some configurations, the anchor portion 140 is a threaded member that is implanted by rotation about the longitudinal axis 148. The illustrated anchor portion 140 comprises a helical member 150. The helical member 150 comprises an elongate member having a circular cross-section, which is wound about the longitudinal axis 148 to define an elongate hollow space 152 extending along the longitudinal axis 148. The anchor portion 140 defines a length 151 that is sufficient for the anchor portion 140 to be secured in the desired tissue.

The drive portion 142 is configured to be engaged by a catheter or other implantation tool to allow for implantation of the tissue anchor 102. The drive portion 142 is fixed for rotation with the anchor portion 140 such that rotation of the drive portion 142 results in rotation of the anchor portion 140.

The drive portion 142 includes a drive surface 154 configured to engage with a drive member of a catheter. In the illustrated arrangement, the drive surface 154 is non-circular in shape. In the illustrated arrangement, the drive surface 154 is defined by an outward-facing surface of the drive portion 142. The drive surface 154 is configured to be engaged by an inward-facing surface of a drive member of a catheter. The illustrated drive surface 154 has a square shape in a plane that is perpendicular to the longitudinal axis 148. However, other shapes can also be used. Moreover, although the illustrated drive surface 154 is an outward-facing surface, the drive surface 154 could be defined by an inward-facing surface of, for example, a tool cavity.

The drive portion 142 defines a length 156 that is sufficient to permit the drive portion 142 to be engaged by a tool, such as a drive member of a catheter. In some configurations, a length of the drive surface 154 is equal to the length 156 of the drive portion 142.

The suture mount portion 144 is movable relative to one or both of the anchor portion 140 and the drive portion 142. In some configurations, the suture mount portion 144 is movable relative to both the anchor portion 140 and the drive portion 142. In the illustrated arrangement, the suture mount portion 144 is rotatable relative to one or both of the anchor portion 140 and the drive portion 142. Preferably, the suture mount portion 144 is rotatable about the longitudinal axis 148 of the tissue anchor 102.

In some configurations, the suture mount portion 144 comprises a cylindrical body portion 158 having a relatively small length 160 or dimension extending along the longitudinal axis 148. In some configurations, the length 160 is smaller than a diameter 162 or a maximum dimension in a direction perpendicular to the longitudinal axis 148. The body portion 158 includes a cylindrical sidewall 164 that defines a peripheral surface of the body portion. The cylindrical sidewall 164 surrounds and, preferably, extends in a direction parallel to the longitudinal axis 148. The cylindrical sidewall 164 defines a center point or axis 168. Preferably, the center point or axis 168 is offset from the longitudinal axis 148 of the tissue anchor 102.

The suture mount portion 144 comprises a suture mount location 170 configured to connect to, engage or otherwise support a suture, line or other tension member. The suture mount location 170 allows the suture 106 to extend from the tissue anchor 102 in a generally perpendicular direction relative to the longitudinal axis 148. As used herein, the suture 106 extending in a generally perpendicular direction means that the suture 106 is oriented closer to the perpendicular direction than a parallel direction.

In some configurations, the suture mount location 170 is configured to allow the suture mount portion 144 and the tissue anchor 102 to slide on the suture 106. In the illustrated arrangement, the suture mount location 170 comprises a passage 172 that extends through the body portion 158 of the suture mount portion 144 from a first surface 174 to a second surface 176. The first surface 174 is nearer the drive portion 142 and the second surface 176 is nearer the anchor portion 140. In some configurations, the passage 172 extends in a direction generally perpendicular to the longitudinal axis 148. The passage 172 of the first tissue anchor 102 allows the suture 106 to be tied or otherwise fixedly secured to the first tissue anchor 102. The passage 172 of the second tissue anchor 104 allows the second tissue anchor 104 to slide along the suture 106 so that the tensioned length 132 can be adjusted. As used herein, the term connect when used to describe the interaction between the suture 106 and the suture mount portion 144 can cover both of these situations unless indicated otherwise.

Preferably, the passage 172 is located on an opposite side of the center point or axis 168 from the longitudinal axis 148. Accordingly, a portion of the body portion 158 that includes the passage 172 is oriented in the direction of force acting on the suture 106. The body portion 158 protrudes from the longitudinal axis 148 a greater distance on the side of the passage 172 in comparison to the side opposite the passage 172. In the illustrated arrangement, the suture 106 extends from an end of the passage 172 closest to the anchor portion 140. Such an arrangement advantageously positions the suture 106 close to the tissue surface to inhibit or reduce leaning of the tissue anchor 102 when the suture 106 is tensioned.

In some configurations, the length 151 of the anchor portion 140 is greater than one or both of the length 156 of the drive portion 142 and the length 160 of the suture mount portion 144. In the illustrated arrangement, the length 151 of the anchor portion 140 is greater than both the length 156 of the drive portion 142 and the length 160 of the suture mount portion 144. In some configurations, the length 156 of the drive portion 142 is greater than the length 160 of the suture mount portion 144.

Suture Lock

The suture lock 110 includes a first portion or base 180. A second portion or cap 182 of the suture lock 110 is movable relative to the base 180 along a longitudinal axis 184 of the suture lock 110. The base 180 and the cap 182 are rotationally fixed relative to one another. A threaded fastener 186 passes through an opening 190 in the cap 182 and engages a threaded cavity 192 of the base 180. Rotation of the threaded fastener 186 in a first direction moves the cap 182 toward the base 180 and rotation of the threaded fastener 186 in a second, opposite direction moves the cap 182 away from the base 180. Accordingly, the suture lock 110 can clamp a lock portion 188 of the suture 106 between the base 180 and the cap 182, release the suture 106 to allow for adjustment of the position of the suture lock 110 relative to the suture 106, and then re-clamp the suture 106.

The base 180 and the cap 182 include cooperating structures that inhibit or prevent relative rotation. The cooperating structures can be one or more flat surfaces or non-circular surfaces relative to the longitudinal axis 184.

In the illustrated arrangement, the base 180 is generally cylindrical in shape. The base 180 includes a protruding portion in the form of a central hub 200 that defines at least one non-circular surface (e.g., a flat surface 202). In the illustrated arrangement, the hub 200 defines a pair of flat surfaces 202 that are spaced from one another on opposite sides of the longitudinal axis 184. The illustrated base 180 is symmetrical about the longitudinal axis 184. Accordingly, the flat surfaces 202 as shown are equidistant from the longitudinal axis 184. As used herein with respect to a structure that inhibits or prevents rotation, a non-circular surface is one in which the surface can cooperate with another surface to inhibit or prevent rotation about the longitudinal 184. Such surfaces can include, for example, flat surfaces or curved surfaces that have a curvature about a center that is not located on the longitudinal axis 184.

The flat surfaces 202 each have at least a component that extends in a direction parallel to the longitudinal axis 184. In the illustrated arrangement, the flat surfaces 202 each are oriented parallel to the longitudinal axis 184. Accordingly, the flat surfaces 202 permit axial movement of the cap 182 relative to the base 180 but inhibit or prevent rotational movement of the cap 182 relative to the base 180.

Each of the flat surfaces 202 is created by a cutout section of a cylindrical work piece that extends only partially through the work piece in a longitudinal direction such that the base 180 also includes at least one flange portion or a base flange 204. In the illustrated arrangement, the base 180 includes a pair of flange portions, which are referred to for convenience hereinafter as flanges 204. Each flange 204 defines a shoulder surface or shoulder 206 adjacent the flat surfaces 202. The shoulders 206 provide a stop surface to limit axial movement of the cap 182 along the longitudinal axis 184. The shoulders 206 also provide a surface against which the suture 106 can be clamped, as is described further below.

The cap 182 is generally cylindrical in shape with a central cut-out defining a space 210 that receives a portion of the base 180. In particular, the space 210 receives the hub 200 of the base 180. The illustrated cap 182 defines an end wall portion 212 and a pair of (e.g., a first and a second) depending side wall portions 214 that cooperate to define the space 210. The end wall portion 212 defines the opening 190 through which the threaded fastener 186 passes. The first and second side wall portions 214 each define a surface 216 that cooperates with one of the flat surfaces 202 to inhibit or prevent relative rotation between the base 180 and the cap 182. The surfaces 216 can be non-circular. In the illustrated arrangement, the surfaces 216 of the side wall portions 214 are flat. Thus, in the illustrated arrangement, both the surfaces 202 of the base 180 and the surfaces 216 are flat. However, other arrangements are possible in which only one of the surfaces 202, 216 are flat or in which neither of the surfaces 202, 216 are flat, but are otherwise configured to cooperate with one another to inhibit or prevent rotation between the base 180 and the cap 182. The illustrated flat surfaces 216 of the cap 182 are in sliding contact with the flat surfaces 202 of the base 180 to permit axial movement and inhibit or prevent rotational movement of the cap 182 relative to the base 180.

The ends of the side wall portions 214 opposite the end wall portion 212 terminate in outwardly or radially-extending flanges 220. The portions of the side wall portions 214 adjacent the flanges 220 define flat surfaces 222. The flat surfaces 222 are parallel to one another in the illustrated arrangement but could be non-parallel in other configurations. The flat surfaces 222 are located radially inward from an outermost extent of the flanges 220 to define a stop surface or shoulder 224. The flat surfaces 222 can be utilized so that a tool (e.g., a catheter) can hold the cap 182 against rotation while the threaded fastener 186 is rotated to move the base 180 and the cap 182 toward or away from one another along the longitudinal axis 184.

As described above, the suture 106 can be captured or clamped between the base 180 and the cap 182. The suture 106 can be captured or clamped between the flange 204 of the base 180 and the corresponding flange 220 of the cap 182. In some configurations, one or both of the base 180 and the cap 182 include a suture retention feature configured to retain the suture 106 to the base 180 and/or cap 182 or at least inhibit or prevent complete separation of the suture 106 from the base 180 and/or cap 182. In the illustrated arrangement, at least one of the flanges 204 of the base 180 includes a suture passage 226 configured to accommodate the suture 106. However, in other arrangements, at least one of the flanges 220 of the cap 182, or both the flange(s) 204 of the base 180 and the flange(s) 220 of the cap 182, can include a suture passage 226.

In the illustrated arrangement, the suture passage 226 extends through the flange 204 from an end surface 230 to the shoulder surface 206. In some configurations, the passage 226 extends in a direction generally parallel to the longitudinal axis 184. As used herein, generally parallel means that the passage 226 is oriented closer to the parallel direction than a perpendicular direction. The passage 226 allows the suture 106 to be retained to the base 180 of the suture lock 110. The passage 226 allows the tissue anchor 110 to slide along the suture 106. The passage 226 retains a portion of the suture 106 between the flange 204 of the base 180 and the flange 220 of the cap 182 so that the suture 106 can be selectively clamped by movement of the cap 182 toward the base 180.

The threaded fastener 186 can be, or can be similar to, a socket head cap bolt. The threaded fastener 186 has a threaded shaft portion or shaft 232 and a head portion or head 234. The head 234 has a larger diameter or cross-sectional size than the shaft 232. The head 234 can define a surface or surfaces configured to engage a tool. In the illustrated arrangement, the head 234 defines a tool cavity 236, such as a hexagon-shaped tool cavity. The shaft 232 passes through the opening 190 of the cap 182 and engages the threaded cavity 192 of the base 180. The head 234 contacts the end wall portion 212 of the cap 182 to retain the cap 182 on the base 180. As described previously, contact between the head 234 and the end wall portion 212 allows the threaded fastener 186 to selectively move the cap 182 toward the base 180 to clamp the suture 106 or to allow the cap 182 to move away from the base 180 to release the suture 106.

Delivery Catheter(s)

As described previously, the system 100 utilizes one or more catheters to deliver and implant or install the components of the system 100 within the desired anatomy of the patient, such as the mitral valve 114 of the heart in the illustrated application. The catheters can be steerable catheters, as is known in the art. In some implementations, the system 100 includes an anchor delivery catheter 250 configured to deliver one or both of the tissue anchors 102, 104 from outside of the patient to within the heart of the patient. The delivery catheter 250 is configured to implant the tissue anchors 102, 104 within the desired tissue of the patient, such as the mitral valve 114.

The delivery catheter 250 includes an elongate catheter body or tube 252. A handle 254 can be connected to the external end of the tube 252 and can be configured to allow a user to control the delivery catheter 250. A delivery end of the tube 252 that is inserted into the patient includes a tip 256 that is configured to engage the tissue anchors 102, 104. The illustrated tip 256 has a first portion 260 and a second portion 262. The first portion 260 is a stationary portion that is secured to the tube 252 in a rotationally fixed manner. The second portion 262 is a rotatable portion that is rotatable relative to the first portion 260 and, thus, to the tube 252.

Figure 7:
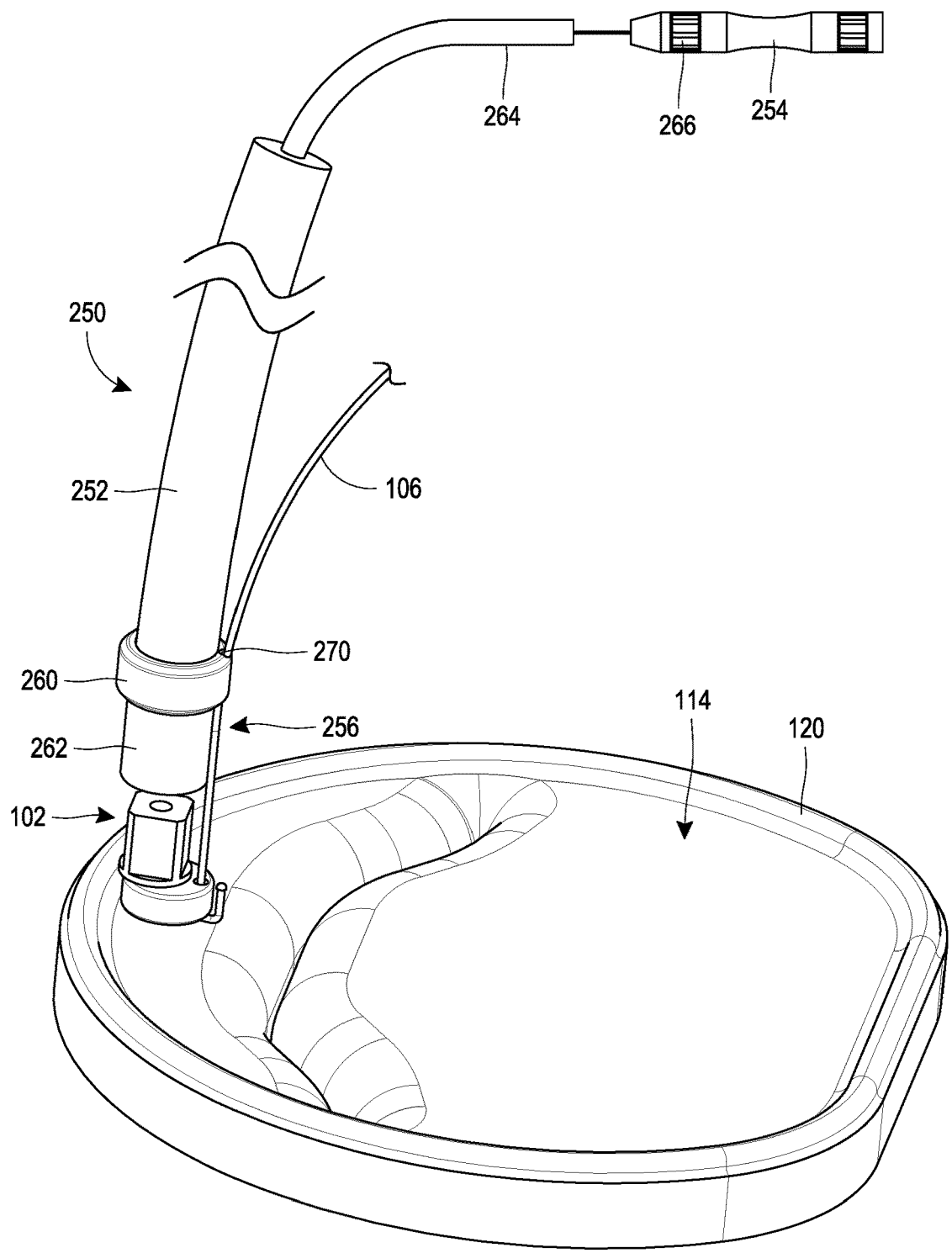
FIG. 7 is a perspective view of a first tissue anchor being implanted at a first location in the mitral valve of a patient.
Figure 8A:
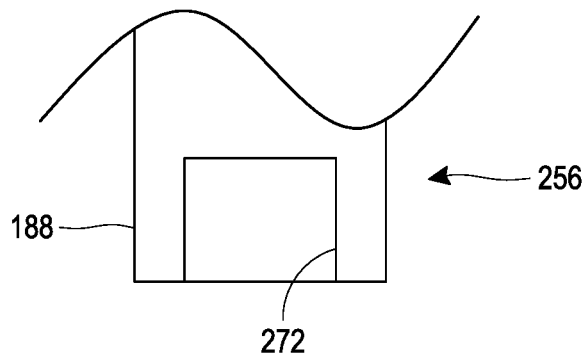
FIG. 8A is a partial sectional view of a tip of a delivery catheter for delivering the tissue anchors.
Figure 8:
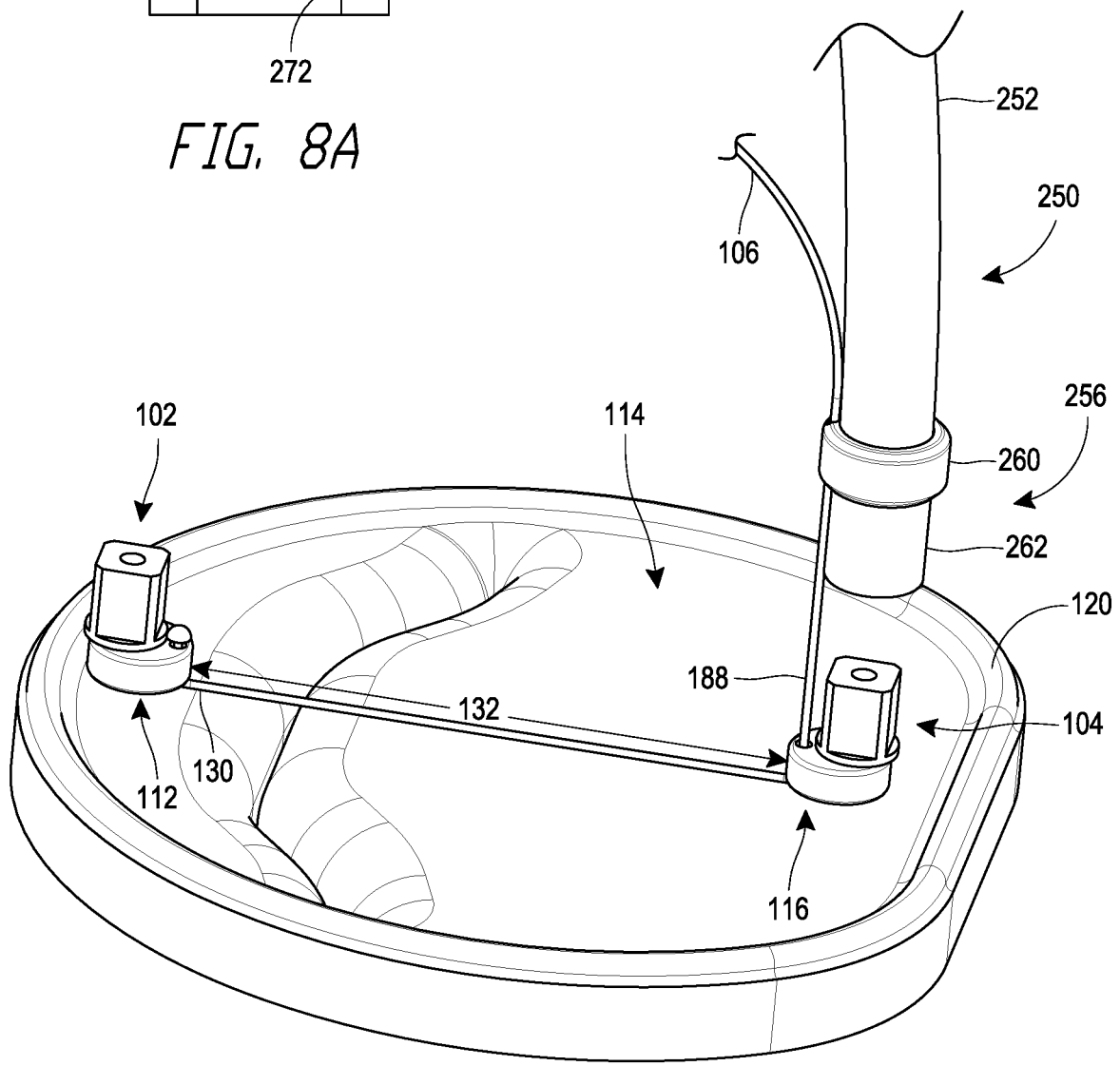
FIG. 8 is a perspective view of a second tissue anchor being implanted at a second location in the mitral valve of the patient.

The delivery catheter 250 includes a drive element configured to selectively rotate the second portion 262 of the tip 256. In the illustrated arrangement, the drive element is an elongate drive shaft 264 that extends through the tube 252 from the handle 254 to the second portion 262 of the tip 256. The drive shaft 264 is coupled to the second portion 262 of the tip 256 in a manner such that torque can be transferred from the drive shaft 264 to the second portion 262 of the tip 256. Accordingly, rotation of the drive shaft 264 causes rotation of the second portion 262 of the tip 256. Rotation of the drive shaft 264 can be actuated from the handle 254, such as via a dial or knob 266 or other suitable control member. The handle 254 in FIG. 7 is not shown to scale.

The first portion 260 of the tip 256 can have a diameter or cross-sectional dimension that is larger than the diameter or cross-sectional dimension of the second portion 262 of the tip 256 and/or the tube 252. Preferably, the diameter or cross-sectional dimension of the first portion 260 of the tip 256 is larger than the diameter or cross-sectional dimension of both the second portion 262 of the tip 256 and the tube 252. The first portion 260 of the tip 256 can include a suture passage 270 configured to accommodate the suture 106. The suture passage 270 can extend generally in an axial direction of the delivery catheter 250. Preferably, the delivery catheter 250 is a "rapid exchange" type catheter in which the suture 106 passes through only a small portion of the catheter 250 and is otherwise external of the catheter 250. In the illustrated configuration, the suture 106 passes only through the suture passage 270 of the tip 256 and is completely external of the tube 252.

The second portion 262 of the tip 256 defines an engagement portion configured to engage the tissue anchor 102, 104 and to transfer torque from the second portion 262 of the tip 256 to the tissue anchor 102, 104. In the illustrated arrangement, the second portion 262 of the tip 256 defines a tool cavity 272 configured to receive the drive portion 142 of the tissue anchor 102, 104. The tool cavity 272 and the drive portion 142 each have non-circular cross-sectional shapes that are complementary to one another. In the illustrated arrangement, each of the tool cavity 272 and the drive portion 142 have a square cross-sectional shape. Thus, the drive portion 142 of the tissue anchor 102, 104 can slide into the tool cavity 272 of the second portion 262 of the tip 256. Accordingly, the tissue anchor 102, 104 can be selectively engaged to and disengaged from the tip 256 of the delivery catheter 250. In addition, rotation of the second portion 262 of the tip 256 causes rotation of the drive portion 142 of the tissue anchor 102, 104.

The illustrated system 100 also includes a suture lock delivery catheter 280 configured to deliver and install the suture lock 110. The delivery catheter 280 can be similar to the delivery catheter 250 that delivers the tissue anchors 102, 104. The illustrated delivery catheter 280 includes an elongate catheter body or tube 282. A handle 284 can be connected to the external end of the tube 282 and can be configured to allow a user to control the delivery catheter 280. A delivery end of the tube 282 that is inserted into the patient includes a tip 286 that is configured to engage the suture lock 110. The tip 286 is secured to the tube 282 in a rotationally fixed manner.

The tip 286 can have a diameter or cross-sectional dimension that is larger than the diameter or cross-sectional dimension of the tube 282. The tip 286 can include a suture passage 290 configured to accommodate the suture 106. The suture passage 290 can extend generally in an axial direction of the delivery catheter 280. Preferably, the delivery catheter 280 is a "rapid exchange" type catheter in which the suture 106 passes through only a small portion of the catheter 280 and is otherwise external of the catheter 280. In the illustrated configuration, the suture 106 passes only through the suture passage 290 of the tip 286 and is completely external of the tube 282.

The tip 286 defines an engagement portion configured to engage the suture lock 110. In particular, the tip 286 is configured to hold the cap 182 of the suture lock 110 and inhibit or prevent rotation of the cap 182 so the threaded fastener 186 can be rotated relative to the cap 182 to move the base 180 toward or away from the cap 182. In the illustrated arrangement, the tip 286 defines a cavity 292 configured to receive the cap 182 of the suture lock 110. The cavity 292 includes engagement surfaces 294 that engage the flat surfaces 222 of the cap 182 of the tissue anchor 110. Thus, the cap 182 of the suture lock 110 can slide into the cavity 292 of the tip 286. Accordingly, the cap 182 of the suture lock 110 can be selectively engaged to and disengaged from the tip 286 of the delivery catheter 280. In addition, the tip 286 can hold the cap 182 of the suture lock 110 against rotation.

Figures 9, 9A:
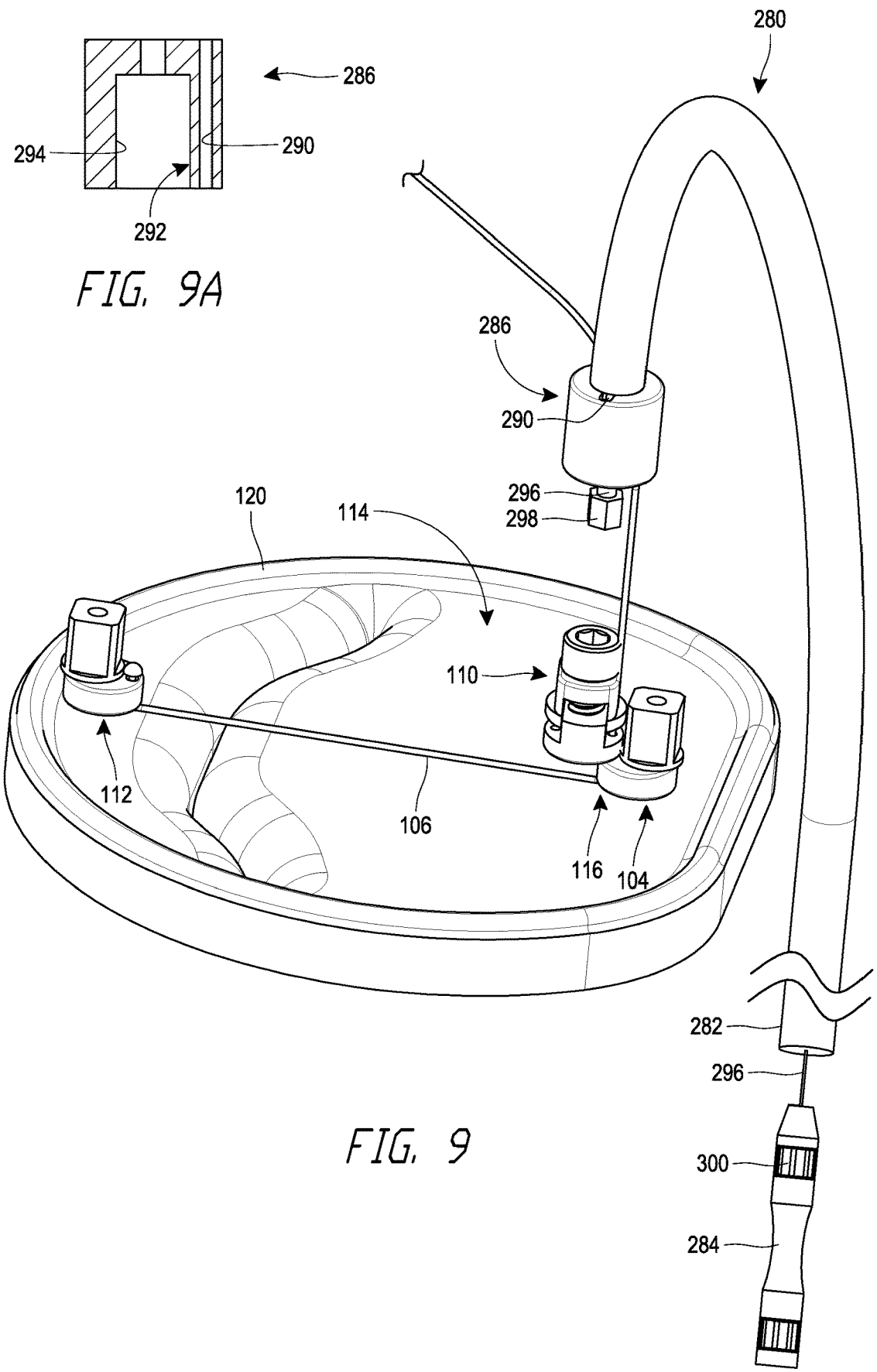
FIG. 9 is a perspective view of a suture lock being placed at the second location in the mitral valve of the patient.
FIG. 9A is a sectional view of a tip of a delivery catheter for delivering the suture lock.

The delivery catheter 250 includes a drive element configured to selectively rotate the threaded fastener 186 of the suture lock 110. In the illustrated arrangement, the drive element is an elongate drive shaft 296 that extends through the tube 282 from the handle 284 to the tip 286. The drive shaft 296 carries a drive element, such as a drive tip or drive tool 298 that is configured to transfer torque from the drive shaft 296 to the threaded fastener 186. In the illustrated arrangement, the drive tool 298 has a shape that is complementary to the tool cavity 236 of the threaded fastener 186. Accordingly, rotation of the drive shaft 296 causes rotation of the threaded fastener 186. Rotation of the drive shaft 296 can be actuated from the handle 284, such as via a dial or knob 300 or other suitable control member. The handle 284 in FIG. 9 is not shown to scale.

Suture Trimmer

The system 100 can also include a suture trimmer 350 configured to cut off or trim the excess portion of the suture 106. In the illustrated arrangement, the suture trimmer 350 includes an elongate catheter body or tube 352. A handle 354 can be connected to the external end of the tube 352 and can be configured to allow a user to control the suture trimmer 350. A trimming end of the tube 352 that is inserted into the patient includes a tip 356 that is configured to trim the suture 106.

The illustrated tip 356 has a first portion 360 and a second portion 362. The second portion 362 is axially movable relative to the first portion 360. The first portion 360 supports or houses a cutting blade 364. The second portion 362 is configured to receive and retain the suture 106 for cutting by the cutting blade 354. The second portion 362 defines a suture passage 366 configured to accommodate the suture 106. The suture passage 366 extends in a radially or a generally radial direction of the tube 352. That is, the suture passage 366 can extend in a radial direction or a direction that is oblique relative to a longitudinal axis of the tube 352.

The illustrated second portion 362 of the tip 356 also includes a slot 370 configured to receive the cutting blade 364 when the second portion 362 is moved axially toward the first portion 360. The slot 370 intersects the suture passage 366. Accordingly, when the suture 106 is located within the suture passage 366, the cutting blade 364 can be moved into the slot 370 to cut the suture 106 by movement of the second portion 362 of the tip 356 toward the first portion 360. In the illustrated arrangement, the slot 370 extends through the end of the second portion 362 of the tip 356. However, in other arrangements, the slot 370 could have a closed end. In other arrangements, the second portion 362 of the tip can be stationary and the blade 364 can be configured to move.

Figure 10:
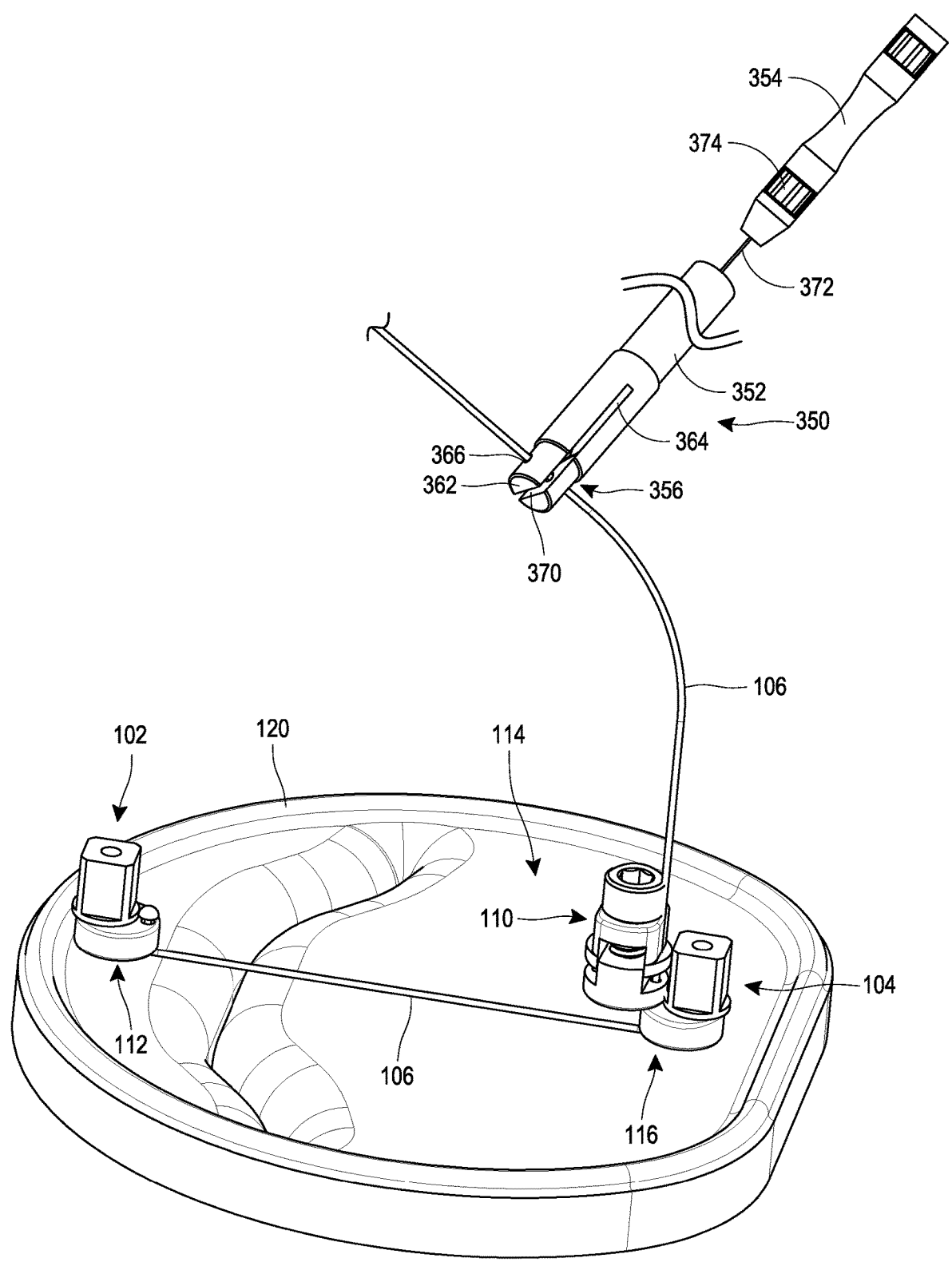
FIG. 10 is a perspective view of an excess portion of the suture being trimmed.
Figure 11:
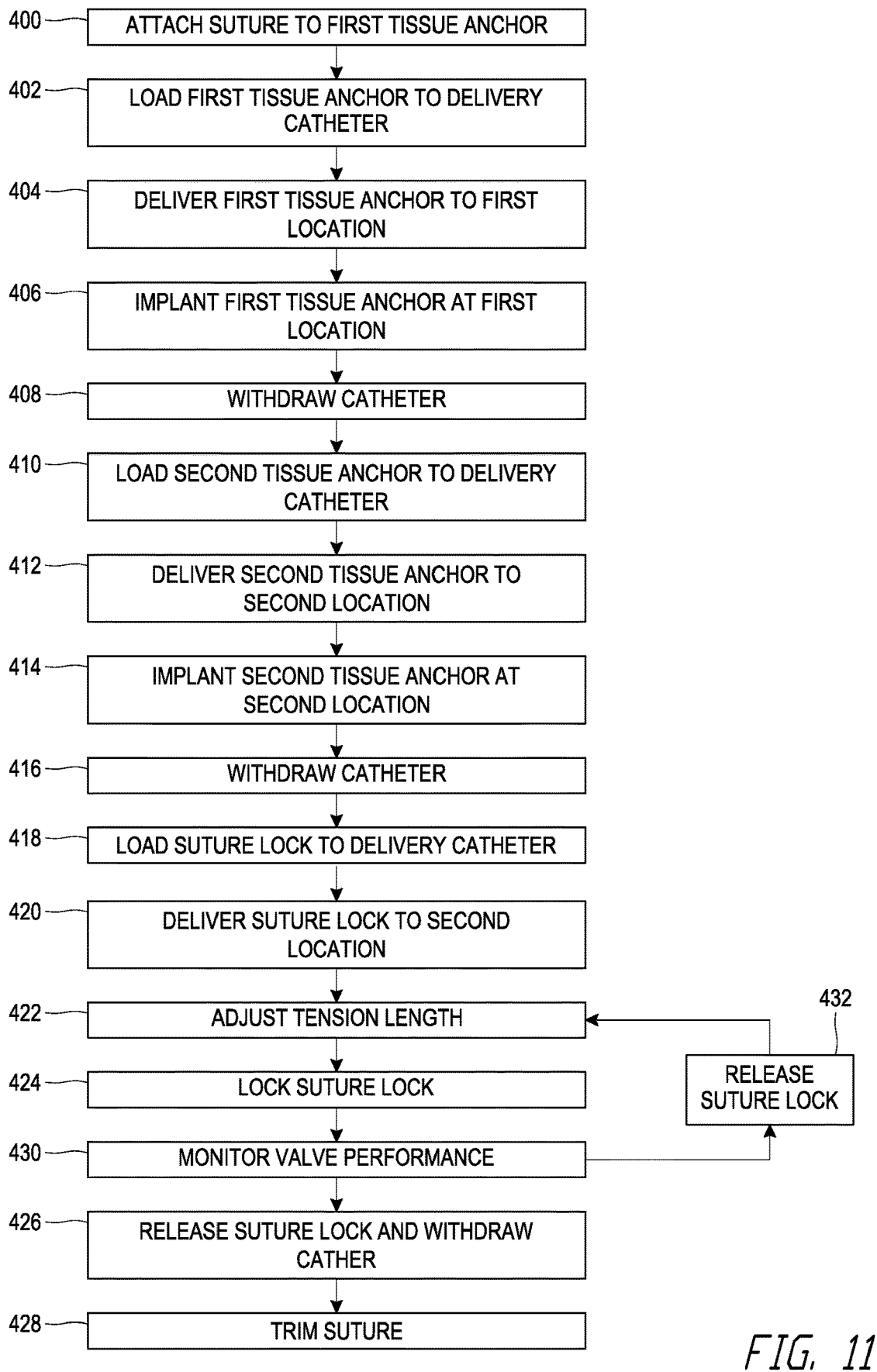
FIG. 11 is a process flow of a method for implanting and, optionally, adjusting a mitral valve remodeling system.

The suture trimmer 350 includes an actuator for moving the second portion 362 toward the first portion 360 for advancing the cutting blade 364 into the slot 370. In the illustrated arrangement, the suture trimmer 350 includes an actuation wire or shaft 372. The actuation wire 372 extends from the handle 354 to the second portion 362 of the tip 356. A user control element, such as a button, knob, dial or lever 374, can be located on the handle 374 and coupled to the actuation wire 372. The control element 374 can apply a pulling force on the actuation wire 372 tending to move the second portion 362 of the tip 356 in an axial direction toward the first portion 360. As a result, the cutting blade 364 is advanced through the slot 370 to cut the suture 106. The handle 354 in FIG. 10 is not shown to scale.

Advantageously, the illustrated arrangement allows the suture 106 to be trimmed at a location close to the suture lock 110. As a result, a relatively short length of excess suture 106 remains within the patient. For example, the excess portion of the suture 106 can be equal to or less than a radius of the tip 356, such as a second portion 362 of the tip 356, if the slot 370 is located in a center of the tube 352 or the tip 356 and the suture passage 366 is oriented in a radial direction of the tube 352 or the tip 356. Accordingly, the second portion 362 of the tip 356 can be configured to have a smaller diameter or cross-sectional dimension than one or both of the first portion 360 of the tip 356 and the tube 352.

Method

The components of the system 100 can be delivered to the mitral valve 114 of the patient by any suitable method. In some configurations, the components of the system 100 are routed to the left atrium via a transeptal approach, wherein an incision is made in the atrial portion of the septum to allow access from the right atrium, such as via the inferior or superior vena cava. A guide catheter 310 can be routed to the left atrium by any suitable method, such as any transvascular approach as is known in the art. The guide catheter 310 can be configured to receive the delivery catheters 250, 280.

In one method of implantation of the system 100, the suture 106 is attached to the first tissue anchor 102 by any suitable arrangement or method, as indicated at block 400. For example, the suture 106 can be passed through the passage 172 of the suture mount location 170 of the first tissue anchor 102 and tied to itself using a suitable knot. Preferably, the suture 106 extends from the second surface 176 of the anchor portion 140 so that the suture 106 is located adjacent to the tissue of the mitral valve 114.

At block 402, the first tissue anchor 102 can be loaded onto the delivery catheter 250. For example, the suture 106 can be passed through the suture passage 270 of the first portion 260 of the tip 256 of the catheter 250. The suture 106 can be passed through the passage 270 in a direction from the tip 256 toward the tube 252. The drive portion 142 of the first tissue anchor 102 can be inserted into the tool cavity 272 of the tip 256 of the catheter 250.

At block 404, the delivery catheter 250 can be used to deliver the first tissue anchor 102 to the first location 112. For example, the delivery catheter 250 can be passed through the guide catheter 310 to the first location 112, using a suitable guidance technique. During delivery, the suture 106 can be tensioned to help maintain the first tissue anchor 102 in engagement with the tip 256.

At block 406, the first tissue anchor 102 is implanted at the first location 112. For example, the knob 266 can be used to rotate the drive shaft 264, which rotates the second portion 262 of the tip 256 of the catheter 250. Rotation of the second portion 262, in turn, rotates the drive portion 142 and anchor portion 140 of the first tissue anchor 102. Rotation of the anchor portion 140 screws the first tissue anchor 102 into the tissue of the mitral valve 114 at the first location 112. Tension can be kept on the suture 106 to inhibit or prevent rotation of the mount portion 144 of the first tissue anchor 102, which can keep the suture 106 from wrapping around the delivery catheter 250.

At block 408, the delivery catheter 250 is withdrawn from the guide catheter 310 leaving the first tissue anchor 102 in place at the first location 112 of the mitral valve 114. The suture 106 can be removed from the tip 256 of the delivery catheter 250.

At block 410, the second tissue anchor 104 can be loaded onto the delivery catheter 250. For example, the suture 106 can be passed through the suture passage 172 of the second tissue anchor 104. The suture 106 can be passed through the suture passage 172 in a direction from the second surface 176 to the first surface 174 so that the suture 106 is located adjacent to the tissue of the mitral valve 114. The suture 106 can be passed through the suture passage 270 of the first portion 260 of the tip 256 of the catheter 250. The suture 106 can be passed through the passage 270 in a direction from the tip 256 toward the tube 252. The drive portion 142 of the second tissue anchor 104 can be inserted into the tool cavity 272 of the tip 256 of the catheter 250.

At block 412, the delivery catheter 250 can be used to deliver the second tissue anchor 104 to the second location 116. For example, the delivery catheter 250 can be passed through the guide catheter 310 to the second location 116, using a suitable guidance technique. During delivery, the suture 106 can be tensioned to help maintain the second tissue anchor 102 in engagement with the tip 256.

At block 414, the second tissue anchor 104 is implanted at the second location 116. For example, the knob 266 can be used to rotate the drive shaft 264, which rotates the second portion 262 of the tip 256 of the catheter 250. Rotation of the second portion 262, in turn, rotates the drive portion 142 and anchor portion 140 of the second tissue anchor 104. Rotation of the anchor portion 140 screws the second tissue anchor 104 into the tissue of the mitral valve 114 at the second location 116. Tension can be kept on the suture 106 to inhibit or prevent rotation of the mount portion 144 of the second tissue anchor 104, which can keep the suture 106 from wrapping around the delivery catheter 250.

At block 416, the delivery catheter 250 is withdrawn from the guide catheter 310 leaving the second tissue anchor 104 in place at the second location 116 of the mitral valve 114. The suture 106 can be removed from the tip 256 of the delivery catheter 250.

At block 418, the suture lock 110 can be loaded onto the delivery catheter 280. For example, the suture 106 can be passed through the suture passage 226 of the base 180 of the suture lock 110. The suture 106 can be passed through the suture passage 226 in a direction from the end surface 230 to the shoulder surface 206. The suture 106 can be passed through the suture passage 290 of the tip 286 of the delivery catheter 280. The drive tool 298 can be inserted into the tool cavity 236 of the threaded fastener 186. The cap 182 can be inserted into the cavity 292 of the tip 286 of the delivery catheter 280.

At block 420, the suture lock 110 can be delivered to the second location 116 using the delivery catheter 280. For example, the delivery catheter 280 can be passed through the guide catheter 310 to the second location 116, using a suitable guidance technique. During delivery, the suture 106 can be tensioned to help maintain the suture lock 110 in engagement with the tip 286.

At block 422, the tension length 132 of the suture 106 can be adjusted. For example, the end surface 230 of the suture lock 110 can be positioned against the first surface 174 of the suture mount portion 144 of the second tissue anchor 104. The suture 106 can be pulled and the column strength of the delivery catheter 280 can hold the second tissue anchor 104 and suture lock 110 in place. Thus, the suture 106 can be pulled through the respective suture passages 172, 226, 290 of the second tissue anchor 104, the suture lock 110 and the tip 286 of the catheter 280. As a result, the first tissue anchor 102 is pulled toward the second tissue anchor 104 and the tension length 132 is reduced. The suture 106 can also be released and the inherent resiliency of the tissue of the mitral valve 114 can increase the tension length 132.

At block 424, once a desired tension length 132 has been achieved, the suture lock 100 can be locked to secure the fix the suture 106 relative to the suture lock 110. For example, the knob 300 can be used to rotate the drive shaft 296. Rotation of the drive shaft 296 rotates the drive tool 298, which rotates the threaded fastener 186 of the suture lock 110. Rotation of the threaded fastener 186 causes the base 180 and cap 182 of the suture lock 110 to move toward one another thereby clamping the suture 106 between the shoulder surface 206 of the base 180 and the flange 220 of the cap 182.

At block 430, once the suture lock 110 has been locked, but before the delivery catheter 280 has been removed from the suture lock 100, the performance or operation of the mitral valve 114 can be monitored by any suitable imaging process.

At block 426, the delivery catheter 280 can be withdrawn leaving the suture lock 110 in place. For example, the catheter tip 286 and the drive tool 298 can be removed from the cap 182 and the threaded fastener 186, respectively, and the delivery catheter 280 can be withdrawn from the guide catheter 310.

At block 428, the excess portion of the suture 106 can be trimmed. For example, the suture 106 can be passed through the suture passage 366 of the suture trimmer 350. The end of the suture trimmer 350 comprising the tip 356 can be inserted into the guide catheter 310 and advanced to the second location 116. The tip 356 slides along the suture 106 such that an end of the suture 106 remains outside of the patient. The suture 106 can guide the tip 356 of the suture trimmer 350 to the suture lock 110. Once the tip 356 of the suture trimmer 350 is located adjacent the suture lock 110, the control element 374 can be actuated to advance the cutting blade 364 within the slot 370 and cut the suture 106. The external end of the suture 106 can be held to maintain tension in the excess portion of the suture 106 to allow for easier cutting.

As described above, the system 100 is configured such that the tension length 132 can be set, the operation of the mitral valve 114 monitored and, if desired, the tension length 132 changed. This process can be repeated until a desired result is achieved.

Optionally, returning to block 430, once the suture lock 110 has been locked, but before the delivery catheter 280 has been removed from the suture lock 100, the performance or operation of the mitral valve 114 can be monitored by any suitable imaging process.

Optionally, at block 432, if an adjustment is desired, the suture lock 110 can release the suture 106 to allow for adjustment of the tension length 132. For example, the knob 300 can be used to rotate the drive shaft 296 and drive tool 298 in a counter-clockwise direction (or opposite the direction used to clamp the suture 106). Rotation of the drive tool 298 rotates the threaded fastener 186, which allows the cap 182 to move away from the base 180. As a result, the suture 106 is no longer clamped between the cap 182 and the base 180 and is permitted to move relative to the suture lock 110 and second tissue anchor 104.

The tension length 132 can be adjusted as described above with respect to block 422. Once a desired tension length 132 is obtained, the suture 106 can be locked as described with respect to block 424. The method can then return to block 430 to permit further monitoring and, if desired, further adjustment. If the desired operation or performance of the mitral valve 114 has been achieved, the method can move to block 426 and block 428 to release the suture lock 110 and trim the suture 106, as described above.

Tissue Anchor Cover

FIGS. 12A-12C illustrate an alternative delivery catheter 250 having a distal tip cover 500 located at the distal end or delivery end of the catheter tube 252. The cover 500 can be configured to accommodate (e.g., cover) the tissue anchor 102, 104 to inhibit or prevent the tissue anchor 102, 104 from damaging tissue (e.g., vasculature or heart tissue) prior to deployment. The cover 500 can be connected, such as bonded or otherwise secured, to or around the tip 256 of the catheter tube 252 at a connection 501. The cover 500 can be generally tubular in form and can define an interior space that receives the tissue anchor 102, 104. The cover 500 can have an open distal end through which the tissue anchor 102, 104 can be deployed.

The cover 500 includes a through hole in the form of a slot 502 that passes in a radial direction through a sidewall of the cover 500. The slot 502 accommodates the suture 106 such that the suture 106 can pass from external of the cover 500 to internal of the cover 500. As described above, the suture 106 engages the tissue anchor 102, 104 that is initially located within the cover 500 prior to deployment. Thus, the suture 106 is located outside of the catheter tube 252 and passes through the slot 502 to engage the tissue anchor 102, 104, as illustrated in FIG. 12B.

The cover 500 also includes a slit 504 that extends lengthwise from the slot 502 to the distal or free end of the cover 500. The slit 504 passes entirely through the sidewall of the cover 500. As a result, the suture 106 can pass from the slot 502 through the slit 504 as the tissue anchor 102, 104 is deployed from the cover 500 thereby allowing the suture 106 can separate or disengage from the cover 500 and the catheter 250. FIG. 12C illustrates the suture 106 passing through the slit 504.

Such an arrangement advantageously provided protection to the tissue anchor 102, 104 and protects other tissues from the sharp end of the tissue anchor 102, 104 until deployment. The cover 500 also allows for simple disengagement of the suture 106 from the cover 500. The cover 500 can be constructed from any suitable material or combination of materials. For example, the cover 500 can be constructed from a suitable medical grade polymer material or materials. The cover 500 can be implemented with the system 100 or components of the system 100 described with respect to FIGS. 1-11, such as the delivery catheter 250 of FIGS. 1-11. Alternatively, the catheter 250 of FIGS. 12A-12C can be utilized with the system 100 of FIGS. 1-11.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

The term "plurality" refers to two or more of an item. Recitations of quantities, dimensions, sizes, formulations, parameters, shapes and other characteristics should be construed as if the term "about" or "approximately" precedes the quantity, dimension, size, formulation, parameter, shape or other characteristic. The terms "about" or "approximately" mean that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. Recitations of quantities, dimensions, sizes, formulations, parameters, shapes and other characteristics should also be construed as if the term "substantially" precedes the quantity, dimension, size, formulation, parameter, shape or other characteristic. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "1 to 3," "2 to 4" and "3 to 5," etc. This same principle applies to ranges reciting only one numerical value (e.g., "greater than 1") and should apply regardless of the breadth of the range or the characteristics being described.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The invention may also be said broadly to consist in the parts, elements and features referred to or indicated in the specification of the application, individually or collectively, in any or all combinations of two or more of said parts, elements or features.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims that follow.

What is claimed is:

1. A tissue anchor, comprising:
an anchor portion comprising a helical thread configured to be implanted into bodily tissue by rotation about a longitudinal axis of the tissue anchor;
a drive portion that is rotatably fixed with respect to the anchor portion, the drive portion configured to removably engage with a drive member of a catheter such that rotation of the drive member rotates the drive portion and the anchor portion of the tissue anchor; and
a cylindrical suture mount portion that:
is rotatable relative to the anchor portion and the drive portion;
defines an eccentric suture mount location at which the suture mount portion is configured to connect to a suture; and
is configured to rotate to align the suture mount location with a direction of force of the suture;
wherein:
the suture mount portion is located between the drive portion and the anchor portion along the longitudinal axis;
the suture mount portion has a cylindrical peripheral surface surrounding the longitudinal axis of the tissue anchor, the peripheral surface defining a geometric center of the suture mount portion, wherein an axis of rotation of the suture mount portion is spaced from the geometric center; and
the suture mount location is on an opposite side of the geometric center from the axis of rotation.

2. The tissue anchor of claim 1, wherein the helical thread of the anchor portion is a helical coil defining a hollow interior space.

3. The tissue anchor of claim 2, wherein the helical coil comprises a circular cross-sectional shape.

4. The tissue anchor of claim 1, wherein the drive portion defines a radially outward-facing drive surface that is configured to engage the drive member of the catheter.

5. The tissue anchor of claim 4, wherein the drive portion comprises a square cross-sectional shape that defines the radially outward-facing drive surface.

6. The tissue anchor of claim 1, wherein the suture mount location comprises a passage extending through the suture mount portion in a direction substantially aligned with the longitudinal axis of the tissue anchor.

7. The tissue anchor of claim 1, wherein a length of the drive portion is greater than a length of the suture mount portion.

8. The tissue anchor of claim 1, wherein the cylindrical suture mount portion includes:
a length along the longitudinal axis; and
a diameter, perpendicular to the longitudinal axis, that is greater than the length.

9. A tissue anchor, comprising:
an anchor portion comprising a helical thread configured to be implanted into bodily tissue by rotation about a longitudinal axis of the tissue anchor;
a drive portion that is rotatably fixed with respect to the anchor portion, the drive portion configured to removably engage with a drive member of a catheter such that rotation of the drive member rotates the drive portion and the anchor portion of the tissue anchor; and
a cylindrical suture mount portion that:
is rotatable relative to the anchor portion and the drive portion;
defines an eccentric suture mount location at which the suture mount portion is configured to connect to a suture; and
is configured to rotate to align the suture mount location with a direction of force of the suture;
wherein:
the suture mount portion is located above the anchor portion along the longitudinal axis, wherein the suture mount portion has a first end surface and a second end surface opposite the first end surface, wherein the second end surface is closer to the anchor portion than the first end surface along the longitudinal axis;
the suture mount portion is configured such that the suture extends from the tissue anchor at or below the second end surface;
the drive portion defines a radially outward-facing drive surface that is configured to engage the drive member of the catheter;
the suture mount portion has a cylindrical peripheral surface surrounding the longitudinal axis of the tissue anchor, the peripheral surface defining a geometric center of the suture mount portion, wherein an axis of rotation of the suture mount portion is spaced from the geometric center; and
the suture mount location is on an opposite side of the geometric center from the axis of rotation.

10. The tissue anchor of claim 9, wherein the suture mount portion is located immediately adjacent the anchor portion.

11. The tissue anchor of claim 9, wherein the helical thread of the anchor portion is a helical coil defining a hollow interior space.

12. The tissue anchor of claim 11, wherein the helical coil comprises a circular cross-sectional shape.

13. The tissue anchor of claim 9, wherein the drive portion comprises a square cross-sectional shape that defines the radially outward-facing drive surface.

14. The tissue anchor of claim 9, wherein the suture mount location comprises a passage extending through the suture mount portion from the first end surface to the second end surface in a direction substantially aligned with the longitudinal axis of the tissue anchor.

15. The tissue anchor of claim 9, wherein a length of the drive portion is greater than a length of the suture mount portion.

16. The tissue anchor of claim 9, wherein the cylindrical suture mount portion includes:
a length along the longitudinal axis; and
a diameter, perpendicular to the longitudinal axis, that is greater than the length.

* * * * *